(12) United States Patent
Jia et al.

(10) Patent No.: US 11,218,962 B2
(45) Date of Patent: Jan. 4, 2022

(54) WIRELESS COMMUNICATION METHOD AND WIRELESS COMMUNICATIONS DEVICE

(71) Applicant: Huawei Technologies Co., Ltd., Shenzhen (CN)

(72) Inventors: Jia Jia, Shenzhen (CN); Xueting Zhang, Wuhan (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/727,522

(22) Filed: Dec. 26, 2019

(65) Prior Publication Data

US 2020/0137682 A1    Apr. 30, 2020

Related U.S. Application Data

(63) Continuation of application No. PCT/CN2018/093092, filed on Jun. 27, 2018.

(30) Foreign Application Priority Data

Jun. 28, 2017    (CN) .......................... 201710507362.3

(51) Int. Cl.
*H04W 52/02* (2009.01)
*H04W 36/00* (2009.01)
*H04W 72/04* (2009.01)

(52) U.S. Cl.
CPC ... *H04W 52/0216* (2013.01); *H04W 36/0079* (2018.08); *H04W 36/00837* (2018.08); *H04W 72/042* (2013.01)

(58) Field of Classification Search
CPC ........... H04W 52/0216; H04W 72/042; H04W 36/00837; H04W 36/0079; H04W 36/08;
(Continued)

(56) References Cited

U.S. PATENT DOCUMENTS 6,622,251 B1    9/2003  Lindskog et al.
2006/0293067 A1   12/2006  Leung et al.
(Continued)

FOREIGN PATENT DOCUMENTS

CN           1354939 A      6/2002
CN         101208976 A      6/2008
(Continued)

OTHER PUBLICATIONS

IEEE Standard for Information technology—Telecommunications and information exchange between systems, Local and metropolitan area networks—Specific requirements, Part 11: Wireless LAN Medium Access Control (MAC) and Physical Layer (PHY) Specifications, IEEE Std 802.11, 2016, Part 1, Dec. 2016, pp. 1-1767.
(Continued)

*Primary Examiner* — Michael Y Mapa
(74) *Attorney, Agent, or Firm* — Hauptman Ham, LLP

(57) ABSTRACT

A wireless communication method and a wireless communications device includes an access point that sends a downlink control signal to a station associated with the access point, and the station receives the downlink control signal from the access point associated with the station, where the downlink control signal includes data of maximum allowable sleep duration corresponding to the station, and a wake-up receiver wakes up the station when sleep duration of the station reaches the maximum allowable sleep duration.

28 Claims, 9 Drawing Sheets

(58) Field of Classification Search
CPC . H04W 48/08; H04W 48/16; H04W 52/0212; H04W 52/0225; H04W 52/0248; H04W 36/0055; Y02D 30/70
USPC .......................... 455/436–444; 370/252, 331
See application file for complete search history.

(56) References Cited

U.S. PATENT DOCUMENTS

| | | | |
|---|---|---|---|
| 2007/0167165 A1* | 7/2007 | Yang | H04W 36/0055 455/439 |
| 2008/0133954 A1 | 6/2008 | Fallah et al. | |
| 2008/0137632 A1* | 6/2008 | Choi | H04W 52/0229 370/342 |
| 2013/0223310 A1 | 8/2013 | Chou et al. | |
| 2014/0018085 A1* | 1/2014 | Young | H04W 52/0235 455/450 |
| 2015/0011216 A1* | 1/2015 | Jung | H04W 36/0072 455/436 |
| 2015/0312857 A1* | 10/2015 | Kim | H04W 76/28 370/311 |
| 2016/0302117 A1* | 10/2016 | Inoue | H04W 36/0088 |
| 2017/0223584 A1* | 8/2017 | Deng | H04W 76/28 |
| 2020/0163047 A1* | 5/2020 | Yoon | H04W 68/005 |

FOREIGN PATENT DOCUMENTS

| | | |
|---|---|---|
| CN | 101472272 A | 7/2009 |
| CN | 105636183 A | 6/2016 |
| KR | 20150124693 A | 11/2015 |

OTHER PUBLICATIONS

IEEE Standard for Information technology—Telecommunications and information exchange between systems, Local and metropolitan area networks—Specific requirements, Part 11: Wireless LAN Medium Access Control (MAC) and Physical Layer (PHY) Specifications, IEEE Std 802.11, 2016, Part 2, Dec. 2016, pp. 1767-3534.
Draft Standard for Information technology—Telecommunications and information exchange between systems, Local and metropolitan area networks—Specific requirements, Part 11: Wireless LAN Medium Access Control (MAC) and Physical Layer (PHY) Specifications, Amendment 6: Enhancements for High Efficiency WLAN, IEEE P802.11ax™/D1.2, Apr. 2017, 488 pages.
Machine Translation and Abstract of Chinese Publication No. CN101472272, Jul. 1, 2009, 17 pages.
Machine Translation and Abstract of Chinese Publication No. CN105636183, Jun. 1, 2016, 7 pages.
Machine Translation and Abstract of Chinese Publication No. KR20150124693, Nov. 6, 2015, 4 pages.
Chinese Notice of Allowance issued in corresponding Chinese Application No. 201710507362.3, dated Dec. 1, 2020, pp. 1-4.

* cited by examiner

| 802.11 legacy preamble | Wake-up frame preamble | Access point identifier | Wake-up frame payload | Another part |

WIRELESS COMMUNICATION METHOD AND WIRELESS COMMUNICATIONS DEVICE

CROSS-REFERENCE TO RELATED APPLICATIONS

This application is a continuation application of International Patent Application No. PCT/CN2018/093092, filed on Jun. 27, 2018, which claims priority to Chinese Patent Application No. 201710507362.3, filed on Jun. 28, 2017, both of which are hereby incorporated by reference in their entireties.

TECHNICAL FIELD

This application relates to the wireless communications field, and in particular, to a wireless communication method and a wireless communications device.

BACKGROUND

Short-range wireless communications technologies (for example, IEEE802.11a, IEEE802.11b, BLUETOOTH, BLUETOOTH low energy (BLE), or a cellular telecommunications standard such as 3rd Generation Partnership Project (3GPP) Long-Term Evolution (LTE) and LTE evolution (LTE-A)) become increasingly popular in applications that are used to implement communication between a fixed device and a portable device, and can provide a large quantity of users with communication that has low energy consumption, low costs, and high bandwidth. The characteristic of low energy consumption is gradually and widely discussed in the industry. Especially for a development requirement of the Internet of things (IoT) based on a short-range wireless communications technology, the characteristic of low energy consumption is particularly important. In this context, a sleep mechanism of a communications device is widely used to enhance overall energy consumption of a short-range wireless network.

For example, in a wireless local area network (WLAN), one access point (AP) may connect the wireless network and one or more stations (STA) associated with the access point, and the AP and the STAs associated with the AP form a basic service set (BSS). In consideration that the STA does not need to maintain complex communication with the AP at all time, the STA is designed to be enabled to sleep, and a STA in a sleep may be woken up by an associated AP. Therefore, the STA in the sleep may retain only a simple communication function of receiving a wake-up instruction, and most components used for a complex communication function may run with extremely low energy consumption in a sleep. Therefore, overall energy consumption is greatly reduced.

However, the foregoing sleep mechanism has a disadvantage that the STA is easily disconnected. If a STA moves, in a sleep period, out of a communication range of an AP associated with the STA, a wake-up instruction sent by the AP cannot arrive at the STA. In addition, because no destination address of a wake-up instruction sent by another AP points to the STA, the STA cannot be woken up. Therefore, the STA is always in a sleep state in which the STA cannot be woken up and cannot be discovered by any other AP. In other words, the STA is always in a disconnected state in which the STA is out of all BSSs.

SUMMARY

This application provides a wireless communication method and a wireless communications device in order to overcome a disadvantage that a station is easily disconnected in a sleep mechanism of a related wireless communications system.

According to a first aspect, this application provides a wireless communication method applied to a station, including receiving a downlink control signal from an access point associated with the station, where the downlink control signal includes data of maximum allowable sleep duration corresponding to the station, and waking up the station when sleep duration of the station reaches the maximum allowable sleep duration.

According to the wireless communication method provided in this embodiment, the data of the maximum allowable sleep duration can be transmitted to the station using the downlink control signal such that the station ends a sleep when the sleep duration reaches the maximum allowable sleep duration, and the station can be prevented from being always in a sleep state in which the station cannot be woken up and cannot be discovered by any other access point. Therefore, the wireless communication method can be used to reduce or avoid occurrence of a case in which the station is disconnected, to improve reliability of a wireless communications system.

In a possible implementation, the receiving a downlink control signal from an access point associated with the station includes receiving a handover management signal from a first access point when the station is not in a sleep, where the first access point is an access point that is associated with the station at a current moment, the handover management signal includes an identifier of a target access point and the data of the maximum allowable sleep duration corresponding to the station, and the handover management signal is used to instruct the station to change the associated access point to the target access point.

In this embodiment, a process of changing an association relationship based on the handover management signal can be used to change a case in which the station passively determines whether the station moves out of a service range to a case in which the station is actively associated with the target access point. Therefore, time, energy, and communication resources that are consumed when the station repeatedly communicates with the first access point can be saved, and an access point that is associated with the station after the change can be controlled.

In a possible implementation, the wireless communication method further includes, after the handover management signal is received, sending a first association request signal based on the identifier of the target access point in the handover management signal in order to attempt to associate the station with the target access point, and when the attempt to associate the station with the target access point fails and a preset first retry condition is met, controlling the station to start a sleep in order to attempt again to associate the station with the target access point after the station ends the sleep.

In this embodiment, in a range of a quantity of allowable re-attempts that is limited by the first retry condition, the station falls into a sleep each time an attempt fails. This better helps to reduce energy consumption in comparison with a case of consecutive re-attempts.

In a possible implementation, the wireless communication method further includes receiving a wake-up signal when the station is in the sleep, and in the sleep that is of the station and that is started through controlling performed when the preset first retry condition is met, when any wake-up signal from the target access point is received, waking up the station.

In this embodiment, listening, in the sleep, to the wake-up signal from the target access point can help to shorten duration from a moment at which the station enters a service range of the target access point to a moment at which the station is associated with the target access point. This not only helps the station to start to perform uplink data transmission earlier, but also helps to avoid an association failure caused when the station passes, in the sleep, through the service range of the target access point.

In a possible implementation, the wireless communication method further includes sending a second association request signal when the preset first retry condition is not met in order to attempt to associate the station with the first access point, and when the attempt to associate the station with the first access point fails and a preset second retry condition is met, controlling the station to start a sleep in order to attempt again to associate the station with the first access point after the station ends the sleep.

In this embodiment, in a range of a quantity of allowable re-attempts that is limited by the second retry condition, the station falls into a sleep each time an attempt fails. This better helps to reduce energy consumption in comparison with a case of consecutive re-attempts.

In a possible implementation, the wireless communication method further includes receiving the wake-up signal when the station is in the sleep, and in the sleep that is of the station and that is started through controlling performed when the preset second retry condition is met, when any wake-up signal from the first access point is received, waking up the station.

In this embodiment, listening, in the sleep, to the wake-up signal from the first access point can help to shorten duration from a moment at which the station enters a service range of the first access point to a moment at which the station is associated with the first access point. This not only helps the station to start to perform uplink data transmission earlier, but also helps to avoid an association failure caused when the station passes, in the sleep, through the service range of the first access point.

In a possible implementation, the wireless communication method further includes, when the preset second retry condition is not met, controlling the station to start a sleep, receiving the wake-up signal when the station is in the sleep, and in the sleep that is of the station and that is started through controlling performed when the preset second retry condition is not met, when any wake-up signal from any access point is received, waking up the station in order to attempt to associate the station with the access point.

In this embodiment, the station can repeatedly attempt to be associated with any surrounding access point, and properly enter a sleep state to reduce power consumption.

In a possible implementation, the wireless communication method further includes sending an acknowledgment signal to the first access point after the handover management signal is received such that a disassociation process is completed between the station and the first access point.

In this embodiment, a disassociation from the first access point is completed when the handover management signal is received, to avoid a conflict between association relationships between the station and access points.

In a possible implementation, the waking up the station when sleep duration of the station reaches the maximum allowable sleep duration includes, before an operation procedure performed in response to the handover management signal ends, waking up the station when sleep duration of any sleep of the station reaches the maximum allowable sleep duration in the handover management signal.

In this embodiment, before the operation procedure performed in response to the handover management signal ends, the operation of waking up the station is performed when the sleep duration of any sleep of the station reaches the maximum allowable sleep duration in the handover management signal. Therefore, it can be ensured that in any case, the station is not always in a disconnected state in which the station is out of all BSSs. That is, a disadvantage that the station is easily disconnected in a sleep mechanism of a related wireless communications system can be overcome.

In a possible implementation, the receiving a downlink control signal from an access point associated with the station includes receiving a configuration update signal from the access point associated with the station, to update, based on data of maximum allowable sleep duration in the configuration update signal, the maximum allowable sleep duration stored by the station.

In this embodiment, an access point controls maximum sleep duration that is of a station associated with the access point and that is in each time period (between two adjacent moments at which the configuration update signals are received), to control and manage maximum allowable sleep duration of each station.

According to a second aspect, this application provides a wireless communication method applied to an access point, including sending a downlink control signal to a station associated with the access point, where the downlink control signal includes data of maximum allowable sleep duration corresponding to the station such that the station ends a sleep when sleep duration reaches the maximum allowable sleep duration.

In a possible implementation, the sending a downlink control signal to a station associated with the access point includes sending a handover management signal to the station, where the handover management signal includes an identifier of a target access point and the data of the maximum allowable sleep duration corresponding to the station, and the handover management signal is used to instruct the station to change the associated access point to the target access point.

In a possible implementation, the wireless communication method further includes receiving an acknowledgment signal from the station after the handover management signal is sent to the station such that a disassociation process is completed between the access point and the station.

In a possible implementation, the sending a downlink control signal to a station associated with the access point includes sending a configuration update signal to the station associated with the access point such that the station updates, based on data of maximum allowable sleep duration in the configuration update signal, the maximum allowable sleep duration stored by the station.

According to a third aspect, this application provides a wireless communications device applied to a station, including a first receiving unit configured to receive a downlink control signal from an access point associated with the station, where the downlink control signal includes data of maximum allowable sleep duration corresponding to the station, and a first wake-up unit configured to wake up the station when sleep duration of the station reaches the maximum allowable sleep duration.

In a first possible implementation, the first receiving unit includes a first receiving module configured to receive a handover management signal from a first access point when the station is not in a sleep, where the first access point is an access point that is associated with the station at a current moment, the handover management signal includes an identifier of a target access point and the data of the maximum allowable sleep duration corresponding to the station, and the handover management signal is used to instruct the station to change the associated access point to the target access point.

In a possible implementation, the wireless communications device further includes a first sending unit configured to, after the handover management signal is received, send a first association request signal based on the identifier of the target access point in the handover management signal in order to attempt to associate the station with the target access point, and a first control unit configured to, when the attempt to associate the station with the target access point fails and a preset first retry condition is met, control the station to start a sleep in order to attempt again to associate the station with the target access point after the station ends the sleep.

In a possible implementation, the wireless communications device further includes a second receiving unit is configured to receive a wake-up signal when the station is in the sleep, and a second wake-up unit configured to, in the sleep that is of the station and that is started through controlling performed when the preset first retry condition is met, when any wake-up signal from the target access point is received, wake up the station.

In a possible implementation, the wireless communications device further includes a second sending unit configured to send a second association request signal when the preset first retry condition is not met in order to attempt to associate the station with the first access point, and a second control unit configured to, when the attempt to associate the station with the first access point fails and a preset second retry condition is met, control the station to start a sleep in order to attempt again to associate the station with the first access point after the station ends the sleep.

In a possible implementation, the wireless communications device further includes a third wake-up unit, where the second receiving unit is configured to receive the wake-up signal when the station is in the sleep, and the third wake-up unit is configured to, in the sleep that is of the station and that is started through controlling performed when the preset second retry condition is met, when any wake-up signal from the first access point is received, wake up the station.

In a possible implementation, the wireless communications device further includes a third control unit and a fourth wake-up unit, where the third control unit is configured to, when the preset second retry condition is not met, control the station to start a sleep, the second receiving unit is configured to receive the wake-up signal when the station is in the sleep, and the fourth wake-up unit is configured to, in the sleep that is of the station and that is started through controlling performed when the preset second retry condition is not met, when any wake-up signal from any access point is received, wake up the station in order to attempt to associate the station with the access point.

In a possible implementation, the wireless communications device further includes a third sending unit configured to send an acknowledgment signal to the first access point after the handover management signal is received such that a disassociation process is completed between the station and the first access point.

In a possible implementation, the first wake-up unit is further configured to, before an operation procedure performed in response to the handover management signal ends, wake up the station when sleep duration of any sleep of the station reaches the maximum allowable sleep duration in the handover management signal.

In a first possible implementation, the first receiving unit includes a second receiving module configured to receive a configuration update signal from the access point associated with the station, to update, based on data of maximum allowable sleep duration in the configuration update signal, the maximum allowable sleep duration stored by the station.

According to a fourth aspect, this application provides a wireless communications device applied to a station, including a sending unit configured to send a downlink control signal to a station associated with the access point, where the downlink control signal includes data of maximum allowable sleep duration corresponding to the station such that the station ends a sleep when sleep duration reaches the maximum allowable sleep duration.

In a first possible implementation, the sending unit includes a first sending module configured to send a handover management signal to the station, where the handover management signal includes an identifier of a target access point and the data of the maximum allowable sleep duration corresponding to the station, and the handover management signal is used to instruct the station to change the associated access point to the target access point.

In a possible implementation, the wireless communications device further includes a receiving unit configured to receive an acknowledgment signal from the station after the handover management signal is sent to the station such that a disassociation process is completed between the access point and the station.

In a first possible implementation, the sending unit includes a second sending module configured to send a configuration update signal to the station associated with the access point such that the station updates, based on data of maximum allowable sleep duration in the configuration update signal, the maximum allowable sleep duration stored by the station.

According to the wireless communication method and the wireless communications device provided in the embodiments of this application, the data of the maximum allowable sleep duration can be transmitted to the station using the downlink control signal such that the station ends a sleep when the sleep duration reaches the maximum allowable sleep duration, and the station can be prevented from being always in a sleep state in which the station cannot be woken up and cannot be discovered by any other access point. Therefore, this application can be used to reduce or avoid occurrence of a case in which the station is disconnected, to improve reliability of a wireless communications system.

DESCRIPTION OF EMBODIMENTS

Figure 1:
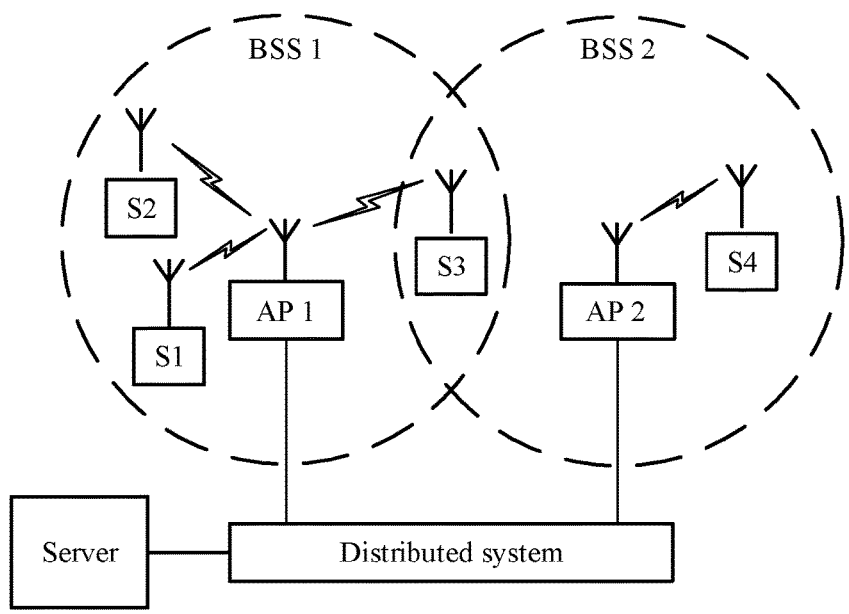
FIG. 1 is a schematic architectural diagram of a WLAN according to an embodiment of this application.

To make the objectives, technical solutions, and advantages of this application clearer, the following further describes this application in detail with reference to the accompanying drawings. The described embodiments are merely a part rather than all of the embodiments of this application.

It should be understood that in the embodiments of this application, a station (Station, STA) may be various user equipments (UE), terminals, mobile stations (MS), mobile terminals (Mobile Terminal), sensor nodes, wireless communications chips, or the like that support a wireless communications protocol such as a WI-FI communications protocol. In some examples, the station may communicate with one or more core networks through a radio access network (RAN). For example, the station may be a mobile phone (or referred to as a "cellular" phone), a wireless communications device having a processor, or the like. For example, the station may alternatively be a portable, pocket-sized, handheld, computer built-in, or in-vehicle mobile apparatus, which exchanges voice and/or data with the RAN. Optionally, the STA may support at least one of a plurality of WLAN standards such as the 802.11ax standard, 802.11ac, 802.11n, 802.11g, 802.11b, 802.11a, and 802.11ba.

It should be further understood that in the embodiments of this application, an AP provides an access service for a station. The access point may be an access point in WI-FI, a base transceiver station (BTS) in global system for mobile communications (GSM) or code division multiple access (CDMA), a NodeB in wideband CDMA (WCDMA), an evolved NodeB (eNB) in LTE, or a sink node in a wireless sensor network, and the access point may be not limited thereto. Optionally, the AP may support at least one of a plurality of WLAN standards such as the 802.11ax standard, 802.11ac, 802.11n, 802.11g, 802.11b, and 802.11a. In addition, in an optional example, the AP needs to support 802.11ba and/or another wake-up/receiving function standard.

Content of the embodiments of this application mainly relates to the station and the access point. The access point is usually configured to connect a wireless network and one or more STA associated with the access point. The access point and the STA associated with the access point may form a BSS. Performance of the access point may be enhanced by monitoring one or more indication parameters of the BSS and adjusting one or more access point operation parameters based on the one or more indication parameters of the BSS. For example, the indication parameter of the BSS may include but is not limited to a service volume of data flowing through the access point, a degree that a related station approaches the access point, an activity level of the BSS, a response of a related station to data that is destined for the related station and that is buffered by the access point, and/or the like. For example, the access point operation parameter may include but is not limited to a clock frequency of the access point, transmit power of the access point, an operation mode of the access point, an occupation rate of a buffer in which the access point is configured to buffer data sent to a related station, and/or the like.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of new service scenarios, the technical solutions provided in the embodiments of this application are also applicable to similar technical problems.

FIG. 1 is an architecture of a WLAN according to an embodiment of this application. The WLAN may include one or more BBSs such as a BSS 1 and a BSS 2. The BSS 1 may include an access point AP 1 and a plurality of STA such as S1, S2, and S3 associated with the access point AP 1. The access point AP 1 may connect a wireless network in the BSS 1 and the associated STA S1, S2, and S3. The BSS 2 may include an access point AP 2 and one or more STA such as S4 associated with the access point AP 2. The access point AP 2 may connect the associated station S4 and a wireless network in the BSS 2. Some STA such as the station S3 may be located in an area in which the BSS 1 and the BSS 2 overlap. In this case, although the station S3 is associated with the access point AP 1 in FIG. 1, the station S3 may change the associated access point to the access point AP 2. In addition, as a relative location between the station and the access point changes, the access point associated with the station and the accessed wireless network may be further switched outside a range shown in FIG. 1.

The access points AP 1 and AP 2 may be connected to a distributed system. The distributed system may be a wired LAN, or the like, and is configured to connect access points such as the access points AP 1, and AP 2. It is not shown in FIG. 1 that the distributed system may be connected to a server or another network, for example, the Internet, the Ethernet, or the IoT. The distributed system may allow any two or more STA (for example, STA S1 and S4) to connect to two different access points (for example, access points AP 1, AP 2) for mutual communication. In addition, the distributed system may allow any station (for example, station S1, S2, S3, or S4) in the WLAN to communicate with another network element (for example, a station associated with another WLAN, a local area network (LAN), or the like) that may be connected to the WLAN.

Figure 2:
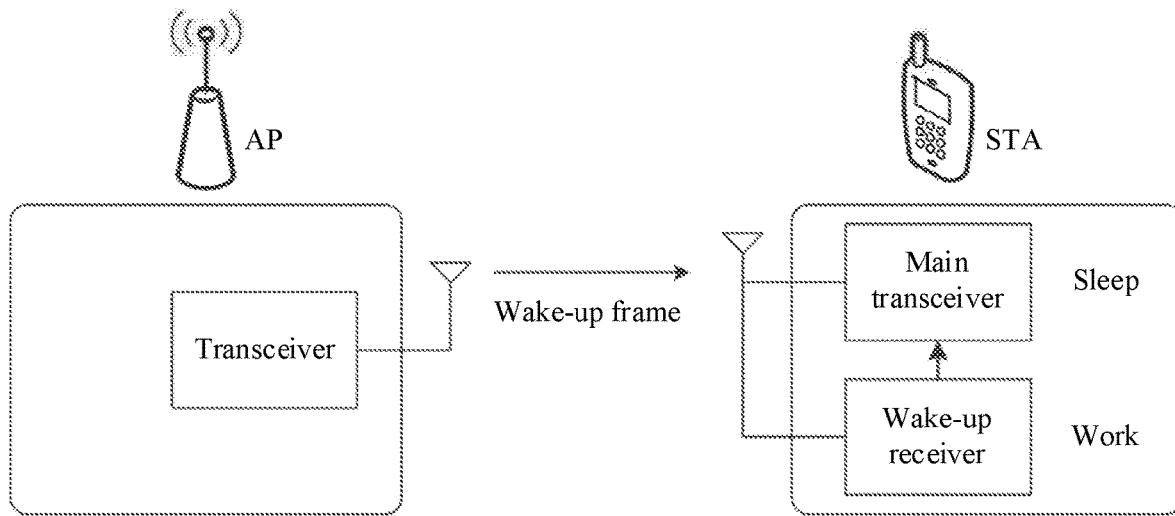
FIG. 2 is a schematic diagram of a principle of a sleep mechanism according to an embodiment of this application.

FIG. 2 is a schematic diagram of a principle of a sleep mechanism according to an embodiment of this application.

Referring to FIG. 2, in this embodiment, a STA includes a main transceiver (MR) and a wake-up receiver (WUR). Optionally, the STA may further include a processor and a memory that are not shown in FIG. 2. The processor is connected to the MR and the WUR, and the memory is connected to the processor. When the STA is not in a sleep state, the MR may perform any required communication with a transceiver of an AP. That is, the MR is constructed to support all possible communication manners between the MR and the AP when the STA is not in the sleep state. The possible communication manners may include some complex communication manners in which there is high energy consumption. Optionally, the MR may include a medium access controller, a baseband chip, a radio frequency (RF) module, a power amplifier, and an antenna. However, when the STA starts a sleep (a sleep trigger condition may be, for example, that no data that needs to be received is detected for preset duration, or that the STA learns, through communication with the AP, that the STA may enter the sleep state for a period of time, and the trigger condition may be not limited thereto), the MR is in the sleep state but the WUR is in a working state. In this case, the WUR listens to a wake-up frame (WUP) sent by the AP associated with the STA, and wakes up the MR when the WUR correctly receives a wake-up frame sent to the WUR (for example, a target address of the wake-up frame successfully matches an address of the STA, and the wake-up frame may be not limited thereto). In an example application scenario, before a sleep, the STA notifies the associated AP that the STA is to enter the sleep state, and the AP sends a wake-up frame to the STA when the STA receives, in a period in which the STA is in the sleep state, downlink data that needs to be sent to the STA, and transmits the downlink data after the WUR wakes up the MR. In this way, the STA does not need to always enable the MR to wait to receive data, and listens to the wake-up frame in a sleep period of the MR using the WUR such that the MR can be in a sleep when the STA is idle, to reduce energy consumption.

It may be understood that it is expected herein that energy consumption of the WUR in a listening/receiving state is far less than working energy consumption of the MR (for example, the former is 0.1 to 1 percent (%) of the latter, or listening/receiving energy consumption of the WUR is less than 100 microwatts (μW)). Therefore, a circuit structure and/or a frame structure designed for the WUR may be configured to be simple or have low complexity. For example, the WUR may include only an energy detection (energy detect) part and a RF part. Therefore, the 3 cannot demodulate some complex modulation schemes. Therefore, an easy-to-implement binary on-off-keying (OOK) modulation scheme, binary phase shift keying (BPSK), or frequency shift keying (FSK) may be used for the wake-up frame.

Figure 3:
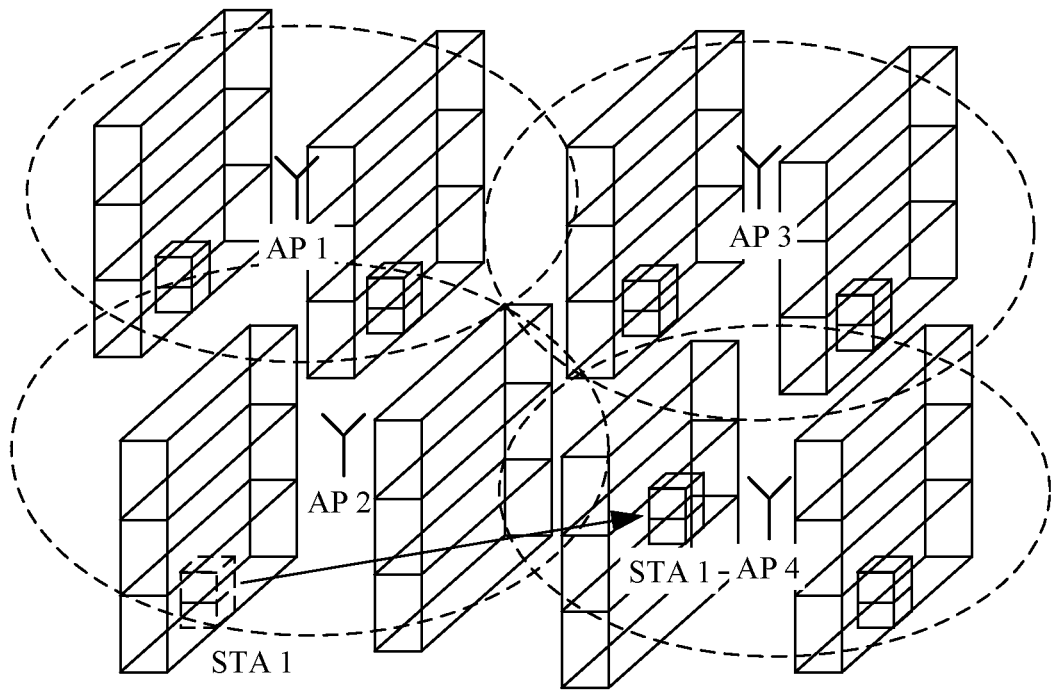
FIG. 3 is a schematic diagram of a scenario in which a station is disconnected according to an embodiment of this application.

FIG. 3 is a schematic diagram of a scenario in which a station is disconnected according to an embodiment of this application. Referring to FIG. 3, several access points implemented by wireless communications devices are distributed in a large warehouse. A BSS in which each access point is located covers a specific location area (a set of covered location areas is referred to as a service range of the access point). For example, four access points AP 1, AP 2, AP 3, and AP 4 shown in FIG. 3 each cover two shelves. Therefore, when a station implemented by a wireless communications device is disposed on goods, a location of the goods can be tracked and statuses of the goods can be monitored in real time based on collection of surrounding information by the station and wireless communication between an access point and the station. For example, a station STA 1 may communicate with a surrounding access point to obtain location data of the STA 1, and report the location data to an associated access point in real time. Therefore, a control center that is connected to the access point using a network can learn, in real time, of a location of the goods corresponding to the station STA 1, to track the location of the goods in real time. However, when the sleep mechanism described above is applied, a problem that the station is disconnected easily occurs.

As shown in FIG. 3, the station STA 1 starts a sleep when receiving a sleep instruction sent by the associated access point AP 2, that is, stops complex communication with the access point AP 2, and only listens to a wake-up frame from the access point AP 2. Subsequently, the goods are accidentally moved out of a service range of the access point AP 2, and enter a service range of the access point AP 4. In this case, because the station STA 1 has moved out of the service range of the access point AP 2, the wake-up frame sent by the access point AP 2 cannot arrive at a location at which the station STA 1 is located. In other words, the access point AP 2 cannot wake up the station STA 1. In this case, although the station STA 1 is in the service range of the access point AP 4, the station STA 1 in a sleep state does not know a location change of the station STA 1, and therefore continues to wait for the wake-up frame from the access point AP 2. Consequently, the access point AP 4 cannot sense existence of the station STA 1 because the access point AP 4 cannot receive any signal from the station STA 1. In addition, even if the station STA 1 receives a wake-up frame from the access point AP 4, a station to which the wake-up frame points may not be the station STA 1, and therefore, the station STA 1 cannot be woken up. As a result, the station STA 1 cannot be discovered or woken up, and cannot wake up to enable a surrounding device to discover the STA 1. Consequently, the station STA 1 is always in a disconnected state in which the STA 1 is out of all BSSs, and becomes a lost station.

Figure 4:
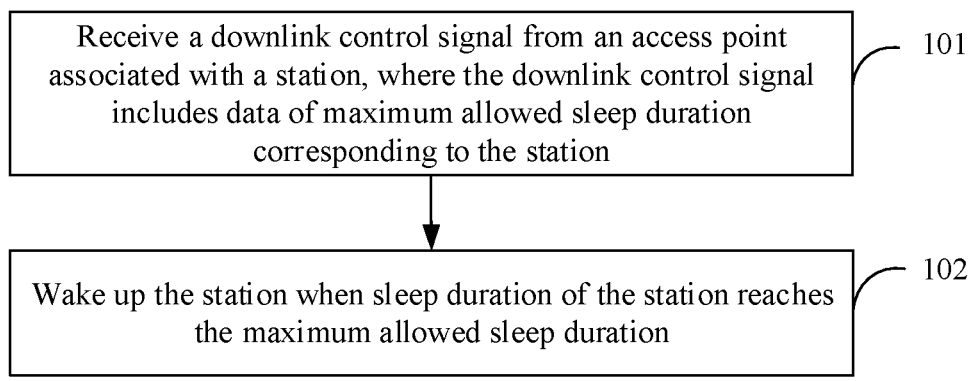
FIG. 4 is a flowchart of steps in a wireless communication method applied to a station according to an embodiment of this application.

FIG. 4 is a flowchart of steps in a wireless communication method applied to a station according to an embodiment of this application. Referring to FIG. 4, the wireless communication method applied to a station includes the following steps.

101. Receive a downlink control signal from an access point associated with the station, where the downlink control signal includes data of maximum allowable sleep duration corresponding to the station.

102. Wake up the station when sleep duration of the station reaches the maximum allowable sleep duration.

It should be noted that the maximum allowable sleep duration may be configured to be static. For example, the downlink control signal is sent by the access point when the station is associated with the access point, configuration data included in the downlink control signal is recorded in the station, and the maximum allowable sleep duration is one piece of the configuration data. In addition, the maximum allowable sleep duration may be alternatively configured to be dynamic. For example, the downlink control signal is sent by the access point before the station starts a sleep, and the station is woken up when sleep duration of the sleep reaches the maximum allowable sleep duration included in the downlink control signal. In addition, the maximum allowable sleep duration may be alternatively recorded in the station as configuration data, and then is updated based on the downlink control signal sent by the access point. Alternatively, the maximum allowable sleep duration may be configured to have a validity period, and the station is woken up only when sleep duration in the validity period reaches the maximum allowable sleep duration. In an implementation, the receiving a downlink control signal from an access point associated with the station may further include receiving a configuration update signal from the access point associated with the station, to update, based on data of maximum allowable sleep duration in the configuration update signal, the maximum allowable sleep duration stored by the station. For example, a component that has a function of waking up the station stores, in an overwrite manner, data of maximum allowable sleep duration in a configuration update signal received each time such that the component can wake up the station based on the stored data of the maximum allowable sleep duration when the sleep duration of the station reaches the maximum allowable sleep duration. In this way, an access point may control maximum sleep duration that is of a station associated with the access point and that is in each time period (between two adjacent moments at which configuration update signals are received), to control and manage maximum allowable sleep duration of each station. It may be understood that a related setting manner of the downlink control signal and the maximum allowable sleep duration may be adaptively set based on an application scenario, and may be not limited to the foregoing manners.

It can be learned that according to the wireless communication method applied to a station provided in this embodiment of this application, the data of the maximum allowable sleep duration can be transmitted to the station using the downlink control signal such that the station ends a sleep when the sleep duration reaches the maximum allowable sleep duration, and the station can be prevented from being always in a sleep state in which the station cannot be woken up and cannot be discovered by any other access point. Therefore, this application can be used to reduce or avoid occurrence of a case in which the station is disconnected, to improve reliability of a wireless communications system, and especially help to implement an IoT architecture in which there is low energy consumption.

Figure 5A:
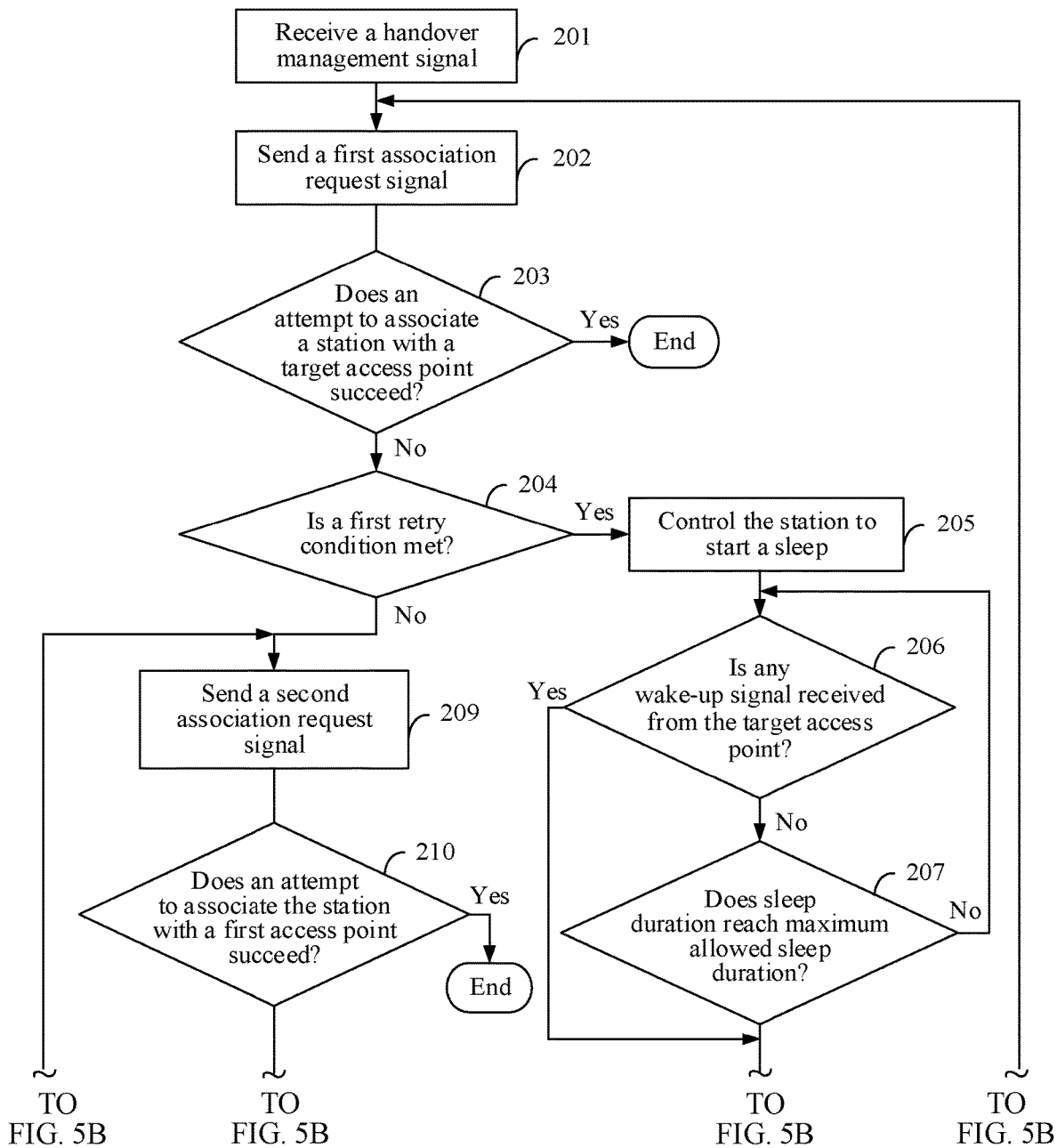
FIG. 5A is a flowchart of steps in a wireless communication method applied to a station according to another embodiment of this application.
Figure 5B:
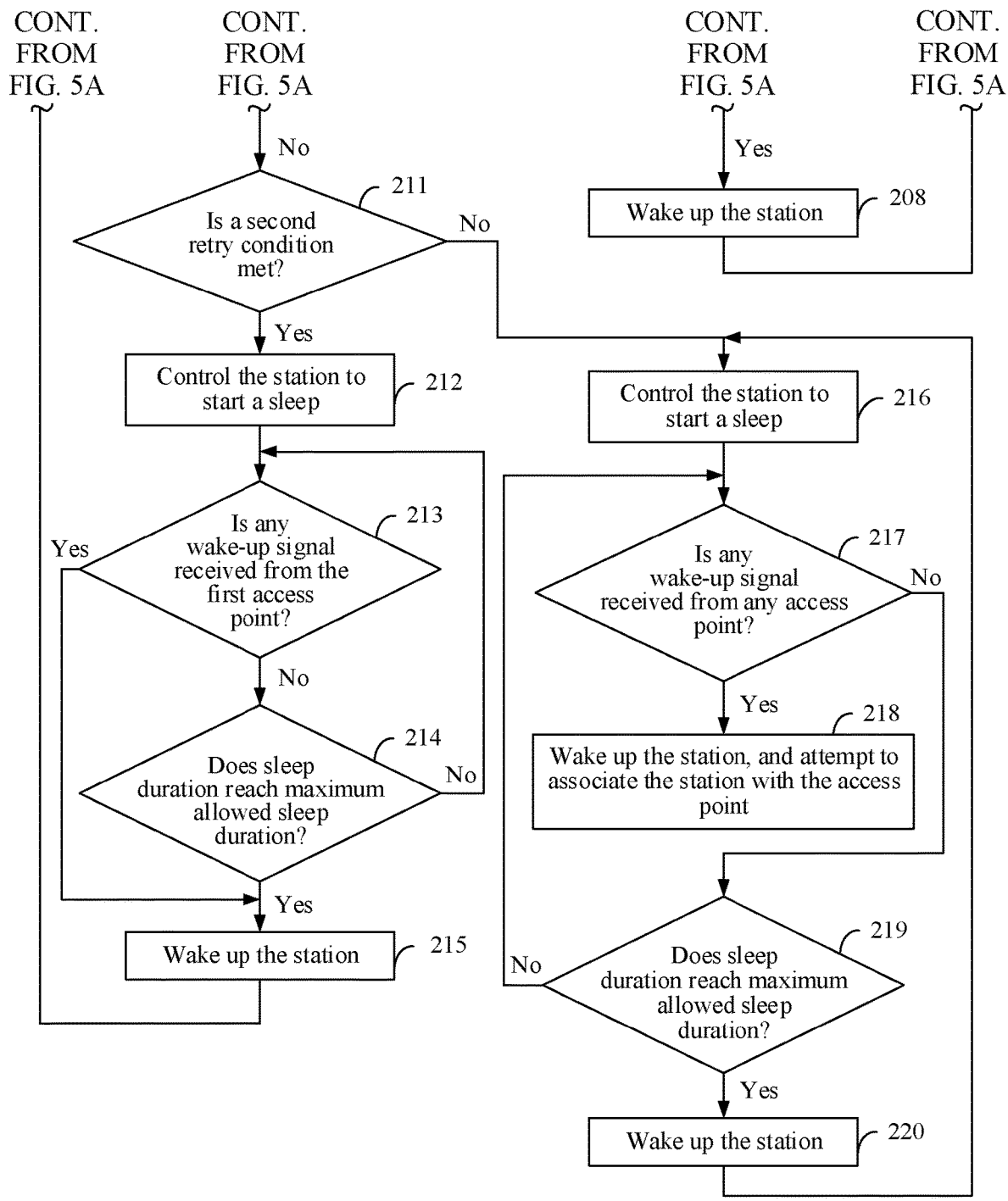
FIG. 5B is a continuation of the flowchart of steps in a wireless communication method applied to a station according to another embodiment of this application.

FIG. 5A and FIG. 5B are a flowchart of steps in a wireless communication method applied to a station according to another embodiment of this application. In an illustrative example, a process shown in FIG. 5A and FIG. 5B is performed in an application scenario described below. As shown in FIG. 3, at a moment, an access point AP 2 learns of a message that a station STA 1 associated with the access point AP 2 is to move out of a service range of the AP 2 and enter a service range of another access point AP 4 (the message may be manually input, may be delivered by a control center, or may be determined based on log information (for example, a goods transportation plan) on a server, or the like. Therefore, it is expected that the station STA 1 changes an associated access point from the access point AP 2 to the access point AP 4. For ease of description, herein, the access point (the access point AP 2) associated with the station STA 1 before the change is referred to as a first access point, and the access point (the access point AP 4) associated with the station STA 1 after the change is referred to as a target access point. In this process, it is expected that the station STA 1 is prevented from being in a disconnected state in which the STA 1 cannot be woken up and cannot be discovered by any other access point, and optionally, it is expected that energy consumption of the station STA 1 is as low as possible in this process.

Referring to the foregoing application scenario, the wireless communication method applied to a station shown in FIG. 5A and FIG. 5B includes the following steps.

201. Receive a handover management signal.

For example, the station receives a handover management signal from a first access point when the station is not in a sleep. The first access point is an access point that is associated with the station at a current moment, the handover management signal includes an identifier of a target access point and data of maximum allowable sleep duration corresponding to the station, and the handover management signal is used to instruct the station to change the associated access point to the target access point.

In an example, when the station STA 1 is not in a sleep, a station AP 2 associated with the station STA 1 generates and sends a handover management frame. A destination address of the handover management frame points to the station STA 1, and carries an identifier or address information (for example, an Internet Protocol (IP) address or a media access control (MAC) address) of the access point AP 4, and data of maximum allowable sleep duration (for example, data corresponding to maximum allowable sleep duration 600 seconds (s)) corresponding to the station STA 1. In an architecture shown in FIG. 2, the station STA 1 may receive the handover management frame using a MR, obtain, from the handover management frame, the identifier or the address information (for example, the IP address or the MAC address) of the access point AP 4 and the data of the maximum allowable sleep duration corresponding to the station STA 1. Under the triggering of the handover management frame, the station starts to perform a related operation of changing the associated access point to the target access point.

It should be noted that, although an example in which there is only one target access point, namely, the access point AP 4 is used herein, the handover management signal may include identifiers of more than one access point. That is, there may be more than one target access point. In addition, when there is more than one target access point, priority information of target access points may be additionally configured in the handover management signals, and is used by the station to determine an association priority order of access points that can be associated.

It can be learned that based on a related design of the handover management signals, the station has a necessary condition to be associated with the target access point such that the station and the access point can cooperate with each other to change an association relationship. In a comparison example, the station STA 1 and the access point AP 2 periodically receive and send a signal, to determine whether the station STA 1 is in the service range of the access point AP 2. When the station STA 1 moves out of the service range of the access point AP 2, after a condition is met, for example, a time of waiting, by the STA 1, for a response frame from the access point AP 2 expires, the station STA 1 determines that the STA 1 has moved out of the service range of access point AP 2. Therefore, the STA 1 attempts to be associated with another neighboring access point. For example, the station STA 1 in FIG. 3 is associated with the access point AP 4 according to this process after determining that the STA 1 moves out of the service range of the access point AP 2. It is easily learned, through comparison, that a process of changing an association relationship based on the handover management signal can be used to change a case in which the station passively determines whether the station moves out of a service range to a case in which the station is actively associated with the target access point. Therefore, time, energy, and communication resources that are consumed when the station repeatedly communicates with the first access point can be saved, and an access point that is associated with the station after the change can be controlled.

202. Send a first association request signal.

For example, after the handover management signal is received, the first association request signal is sent based on the identifier of the target access point in the handover management signal in order to attempt to associate the station with the target access point.

In an example, after the station STA 1 receives a handover management signal from the access point AP 2 using the MR, the station STA 1 sends, using the MR, an association request frame whose destination address points to the access point AP 4. In an example implementation, the association request frame includes all data used by the access point AP 4 to complete an association with the station STA 1. In another example implementation, the association request frame includes only an identifier of the station STA 1, and other data has been provided by the access point AP 2 for the access point AP 4. The foregoing two implementations may be combined with each other (for example, some data is selected based on a requirement and is added to the association request frame, and the other data is provided for the access point AP 4 in another manner). This may not be limited thereto. After sending the association request frame, the station STA 1 may wait for a response frame for the association request frame for a preset period of time.

Optionally, to avoid an association conflict that occurs because a time period in which the station STA 1 is associated with the access point AP 2 overlaps a time period in which the station STA 1 is associated with the access point AP 4, the station STA 1 may complete a disassociation from the access point AP 2 before sending the first association request signal. For example, an operation may be further included between step 201 and step 202 such as sending an acknowledgment signal to the first access point after the handover management signal is received such that a disassociation process is completed between the station and the first access point. In an example, the station STA 1 sends, for the received handover management frame, a response frame (ACK) that is used as an acknowledgment signal such that the access point AP 2 performs a disassociation operation with the station STA 1 when receiving the response frame. Optionally, when the access point AP 2 completes the disassociation operation with the station STA 1, the access point AP 2 may send a notification signal to the station STA 1 such that the station STA 1 starts to perform an association operation with the target access point. It should be noted that a time for disassociating the station with the first access point after the station receives the handover management signal may be selected based on a requirement, and may be not limited to the foregoing manners.

203. When the attempt to associate the station with the target access point succeeds, the procedure ends.

In an example, when the station STA 1 sends the association request frame, the station STA 1 is in the service range of the access point AP 4. Therefore, the access point AP 4 returns a response frame for the received association request frame. In a possible scenario, the access point AP 4 establishes an association relationship with the station STA 1 according to a station association procedure, and therefore, the station STA 1 completes the association relationship change process. Therefore, the procedure ends.

However, it may be understood that a moment at which the first association request signal is sent for a first time is usually a moment at which the handover management signal is just received. In this case, the station probably does not enter a service range of the target access point. Consequently, the station does not receive a response to the first association request signal, and cannot be associated with the target access point either. In an example, a time of waiting, by the station STA 1, for the response frame for the association request frame expires, and therefore, the STA 1 determines that the attempt to associate the station with the target access point fails, and continues to perform step 204. It should be noted that in addition to a case in which the time of waiting, by the STA 1, for the response frame for the association request frame expires, a condition for determining that the attempt to associate the station with the target access point fails may alternatively or additionally include another condition. For example, no signal (for example, no wake-up signal) sent by the target access point is received in a period of time, and/or a signal that is used to enable the station to learn that the station does not enter the service range of the target access point is received. This may be not limited thereto.

204. Determine whether a first retry condition is met at a current moment.

For example, when the attempt to associate the station with the target access point fails and the preset first retry condition is met, step 205 (that is, the attempt is made again to associate the station with the target access point) is performed. When the preset first retry condition is not met, step 209 (that is, no attempt is made any longer to associate the station with the target access point) is performed. That is, the first retry condition is used to determine whether to attempt again to associate the station with the target access point in order to avoid a case in which the attempt is made repeatedly without a limitation when the station can be never associated with the target access point, and consequently, the station is lost. In an example, the first retry condition may be a logical expression in which several sub-conditions are connected using "and" and/or "or". For example, the first retry condition may be specifically that a quantity of times of repeatedly sending the first association request signal is less than A1, a time between the current moment and the moment at which the handover management signal is received is less than A2, and no response for rejecting establishment of an association relationship is received from the target access point. Herein, A1 and A2 are preconfigured parameters (for example, A1 and/or A2 may be included in the handover management signal or any other downlink control signal). With reference to a specific application scenario, the first retry condition in another form may be obtained. Therefore, the first retry condition may be not limited to the foregoing example.

205. When the first retry condition is met, control the station to start a sleep.

For example, when the attempt to associate the station with the target access point fails and the preset first retry condition is met, the station is controlled to start a sleep in order to attempt again to associate the station with the target access point after the station ends the sleep. It can be learned that in a range of a quantity of allowable re-attempts that is limited by the first retry condition, the station falls into a sleep each time an attempt fails. This better helps to reduce energy consumption in comparison with a case of consecutive re-attempts.

206. When the station is in the sleep, determine whether any wake-up signal from the target access point is received.

For example, when the station is in the sleep, the station receives the wake-up signal, and in the sleep that is of the station and that is started through controlling performed when the preset first retry condition is met, when any wake-up signal from the target access point is received, step 208 is performed to wake up the station, and then step 202 is performed to attempt again to associate the station with the target access point. In an example, in a sleep started by the station STA 1 when the first retry condition is met, the STA 1 receives any wake-up frame from the access point AP 4 using a WUR. It may be understood that in this case, the station STA 1 does not establish the association relationship with the access point AP 4. Therefore, even if the station STA 1 receives a wake-up frame from the access point AP 4, a destination address of the wake-up frame does not point to the station STA 1. However, if the station STA 1 can receive the wake-up frame from the access point AP 4, the station STA 1 may determine that the station STA 1 has entered the service range of the access point AP 4. Therefore, the WUR is configured to wake up the MR when receiving a wake-up frame with any content from the access point AP 4. This helps to prevent the station STA 1 from missing, in a sleep, the service range of the access point AP 4.

207. When the station is in the sleep, determine whether sleep duration reaches the maximum allowable sleep duration.

For example, in the sleep that is of the station and that is started through controlling performed when the preset first retry condition is met, when the sleep duration reaches the maximum allowable sleep duration, step 208 is performed to wake up the station, and then step 202 is performed to attempt again to associate the station with the target access point. In an example, when the time of waiting, by the STA 1, for the response frame for the association request frame expires and the STA 1 determines that the first retry condition is met, the station STA 1 controls the MR to start a sleep, and enables the WUR to wake up the MR when sleep duration of the sleep reaches the maximum allowable sleep duration (or controls the MR to wake up automatically when the sleep duration of the sleep reaches the maximum allowable sleep duration, or sets, based on the maximum allowable sleep duration, a timer to trigger an operation of waking up the MR, where this may not be limited thereto).

208. Wake up the station when any wake-up signal from the target access point is received or the sleep duration reaches the maximum allowable sleep duration.

Referring to FIG. 5A and FIG. 5B, step 206 to step 208 may be performed in the following manner, after the station starts the sleep in step 205, listening to the wake-up signal from the target access point, and timing sleep duration simultaneously, and when any condition in step 206 and step 207 is met, performing step 208 to wake up the station, otherwise, enabling the station to continue the sleep. In an example, the MR remains in a sleep state, and the WUR wakes up the MR until a time of the WUR expires or when the WUR receives the wake-up frame from the access point AP 4.

With reference to step 202 to step 208, it can be learned that before the station is successfully associated with the target access point or the first retry condition can be met, the station always performs the processes in step 202 to step 208 cyclically. This forms a first phase after the station receives the handover management signal. In the first phase, the station repeatedly attempts to be associated with the target access point, and properly enters the sleep state to reduce power consumption. Referring to the scenario shown in FIG. 3, if goods corresponding to the station STA 1 are moved from the service range of the access point AP 2 to the service range of the access point AP 4 according to a predetermined plan, before the station STA 1 enters the service range of the access point AP 4, the station STA 1 cyclically performs the following operations sending the association request frame and falling into a sleep, and after the station STA 1 enters the service range of the access point AP 4, the station STA 1 may send the association request frame after a time of a sleep expires and receive a response from the access point AP 4, or may receive, in a sleep, any wake-up frame from the access point AP 4 and wake up to be associated with the access point AP 4.

In an example, the station STA 1 enters the service range of the AP 4 when the STA 1 is in the sleep state. In this case, the access point AP 4 sends a wake-up frame to another station through broadcasting, and the wake-up frame is obtained by the WUR of the station STA 1 through listening. Therefore, the WUR wakes up the MR of the station STA 1 such that the MR sends the association request frame to establish an association with the access point AP 4. In a comparison example, the station STA 1 enters the service range of the AP 4 when the STA 1 is in the sleep state, but the WUR does not listen to the wake-up frame from the access point AP 4. Therefore, the station STA 1 keeps a sleep until the maximum allowable sleep duration is reached, and then attempts to be associated with the access point AP 4. It is easily learned, through comparison, that compared with the comparison example, the foregoing example may help to shorten duration from a moment at which the station enters the service range of the target access point to a moment at which the station is associated with the target access point. This not only helps the station to start to perform uplink data transmission earlier, but also helps to avoid an association failure caused because the station passes, in a sleep, through the service range of the target access point.

Referring to FIG. 5A and FIG. 5B, when the first retry condition cannot be met, the station determines that the station cannot be associated with the target access point. Reasons may be as follows. The station does not move into the service range of the target access point, the target access point disables a wireless communication function, the target access point cannot be associated with more STA, and/or the like. In this case, the station may assume that the station does not move out of a service range of the first access point and attempts to be re-associated with the first access point.

209. Send a second association request signal when the first retry condition is not met.

For example, the second association request signal is sent when the preset first retry condition is not met in order to attempt to associate the station with the first access point.

In an example, when the station STA 1 is not associated with the target access point and the first retry condition is no longer met, the station STA 1 sends, using the MR, an association request frame whose destination address points to the access point AP 2. In an example implementation, the association request frame includes all data used by the access point AP 2 to complete an association with the station STA 1. In another example implementation, the association request frame includes only the identifier of the station STA 1, and other data is stored or obtained by the access point AP 2 in advance. The foregoing two implementations may be combined with each other (for example, some data is selected based on a requirement and is added to the association request frame, and the other data is stored or obtained by the access point AP 2 in advance). This may not be limited thereto. After sending the association request frame, the station STA 1 may wait for a response frame for the association request frame for a preset period of time.

210. When the attempt to associate the station with the first access point succeeds, the procedure ends.

In an example, when the station STA 1 sends the association request frame that is used as the second association request signal, the station STA 1 is in the service range of the access point AP 2. Therefore, the access point AP 2 returns a response frame for the received association request frame. In a possible scenario, the access point AP 2 establishes an association relationship with the station STA 1 according to a station association procedure, and therefore, the station STA 1 completes the association relationship change process. Therefore, the procedure ends.

However, it may be understood that a moment at which the second association request signal is sent for a first time is usually a moment that is a long time later after the handover management signal is received. In this case, the station probably has moved out of a service range of the first access point. Consequently, the station does not receive a response to the second association request signal, and cannot be associated with the first access point either. In an example, a time of waiting, by the station, for the response frame for the association request frame expires, and therefore, the station determines that the attempt to associate the station with the first access point fails, and continues to perform step 211. It should be noted that in addition to a case in which the time of waiting for the response frame for the association request frame expires, a condition for determining that the attempt to associate the station with the first access point fails may alternatively or additionally include another condition. For example, no signal (for example, no wake-up signal) sent by the first access point is received in a period of time, and/or a signal that is used to enable the station to learn that the station does not enter the service range of the first access point is received. This may be not limited thereto.

211. Determine whether a second retry condition is met at a current moment.

For example, when the attempt to associate the station with the first access point fails and the preset second retry condition is met, step 212 (that is, the attempt is made again to associate the station with the first access point) is performed. When the preset first retry condition is not met, step 216 (that is, no attempt is made any longer to associate the station with the first access point) is performed. That is, the second retry condition is used to determine whether to attempt again to associate the station with the first access point in order to avoid a case in which the attempt is made repeatedly without a limitation when the station cannot be associated with the first access point, and consequently, the station is lost. In an example, the second retry condition may be a logical expression in which several sub-conditions are connected using "and" and/or "or". For example, the second retry condition may be specifically that a quantity of times of repeatedly sending the second association request signal is less than B1, a time between the current moment and the moment at which the second association request signal is sent for the first time is less than B2, and no response for rejecting establishment of an association relationship is received from the first access point. Herein, B1 and B2 are preconfigured parameters (for example, B1 and/or B2 may be included in the handover management signal or any other downlink control signal). With reference to a specific application scenario, the second retry condition in another form may be obtained. Therefore, the second retry condition may be not limited to the foregoing example.

212. When the second retry condition is met, control the station to start a sleep.

For example, when the attempt to associate the station with the first access point fails and the preset second retry condition is met, the station is controlled to start a sleep in order to attempt again to associate the station with the first access point after the station ends the sleep. It can be learned that in a range of a quantity of allowable re-attempts that is limited by the second retry condition, the station falls into a sleep each time an attempt fails. This better helps to reduce energy consumption in comparison with a case of consecutive re-attempts.

213. When the station is in the sleep, determine whether any wake-up signal from the first access point is received.

For example, when the station is in the sleep, the station receives the wake-up signal, and in the sleep that is of the station and that is started through controlling performed when the preset second retry condition is met, when any wake-up signal from the first access point is received, step 215 is performed to wake up the station, and then step 209 is performed to attempt again to associate the station with the first access point. In an example, in a sleep started by the station STA 1 when the second retry condition is met, the STA 1 receives any wake-up frame from the access point AP 2 using a WUR. It may be understood that in this case, the station STA 1 does not establish the association relationship with the access point AP 2. Therefore, even if the station STA 1 receives a wake-up frame from the access point AP 2, a destination address of the wake-up frame may not point to the station STA 1. However, if the station STA 1 can receive the wake-up frame from the access point AP 2, the station STA 1 may determine that the station STA 1 has entered the service range of the access point AP 2. Therefore, the WUR is configured to wake up the MR when receiving a wake-up frame with any content from the access point AP 2. This helps to prevent the station STA 1 from missing, in a sleep, the service range of the access point AP 2.

214. When the station is in the sleep, determine whether sleep duration reaches the maximum allowable sleep duration.

For example, in the sleep that is of the station and that is started through controlling performed when the preset second retry condition is met, when the sleep duration reaches the maximum allowable sleep duration, step 215 is performed to wake up the station, and then step 209 is performed to attempt again to associate the station with the first access point. In an example, when the time of waiting, by the STA 1, for the response frame for the association request frame expires and the STA 1 determines that the second retry condition is met, the station STA 1 controls the MR to start a sleep, and enables the WUR to wake up the MR when sleep duration of the sleep reaches the maximum allowable sleep duration (or controls the MR to wake up automatically when the sleep duration of the sleep reaches the maximum allowable sleep duration, or sets, based on the maximum allowable sleep duration, a timer to trigger an operation of waking up the MR, where this may not be limited thereto).

215. Wake up the station when any wake-up signal from the first access point is received or the sleep duration reaches the maximum allowable sleep duration.

Referring to FIG. 5B, step 213 to step 215 may be performed in the following manner. After the station starts the sleep in step 212, listening to the wake-up signal from the first access point, and timing sleep duration simultaneously, and when any condition in step 213 and step 214 is met, performing step 215 to wake up the station, otherwise, enabling the station to continue the sleep. In an example, the MR remains in a sleep state, and the WUR wakes up the MR until a time of the WUR expires or when the WUR receives the wake-up frame from the access point AP 2.

With reference to step 209 to step 215, it can be learned that before the station is successfully associated with the first access point or the second retry condition can be met, the station always performs the processes in step 209 to step 215 cyclically. This forms a second phase after the station receives the handover management signal. In the second phase, the station repeatedly attempts to be associated with the first access point, and properly enters the sleep state to reduce power consumption. Referring to the scenario shown in FIG. 3, if the goods corresponding to the station STA 1 are not moved from the service range of the access point AP 2 to the service range of the access point AP 2 according to the predetermined plan, but always stay static within the service range of the access point AP 2, all attempts to associate the station STA 1 with the access point AP 4 fail, and until the first retry condition is no longer met, the station STA 1 sends the association request frame whose target address points to the access point AP 2 such that the station STA 1 is associated with the access point AP 2.

In an example, the station STA 1 enters the service range of the AP 2 when the STA 1 is in the sleep state. In this case, the access point AP 2 sends a wake-up frame to another station through broadcasting, and the wake-up frame is obtained by the WUR of the station STA 1 through listening. Therefore, the WUR wakes up the MR of the station STA 1 such that the MR sends the association request frame to establish an association with the access point AP 2. In a comparison example, the station STA 1 enters the service range of the AP 2 when the STA 1 is in the sleep state, but the WUR does not listen to the wake-up frame from the access point AP 2. Therefore, the station STA 1 keeps a sleep until the maximum allowable sleep duration is reached, and then attempts to be associated with the access point AP 2. It is easily learned, through comparison, that compared with the comparison example, the foregoing example may help to shorten duration from a moment at which the station enters the service range of the first access point to a moment at which the station is associated with the first access point. This not only helps the station to start to perform uplink data transmission earlier, but also helps to avoid an association failure caused because the station passes, in a sleep, through the service range of the first access point.

Referring to FIG. 5A and FIG. 5B, when the second retry condition cannot be met, the station determines that the station cannot be associated with the first access point. Reasons may be as follows. The station does not move into the service range of the first access point, the first access point disables a wireless communication function, the first access point cannot be associated with more STA, and/or the like. In this case, to avoid a loss of the station, the station may attempt to be associated with any surrounding access point.

216. When the second retry condition is not met, control the station to start a sleep.

217. Determine whether any wake-up signal from any access point is received.

218. When any wake-up signal from any access point is received, wake up the station, and attempt to associate the station with the access point.

For example, when the station is not associated with the target access point or the first access point, and the second retry condition is not met, the station is controlled to start a sleep, and any wake-up signal from any access point is received in the sleep. In the sleep that is of the station and that is started through controlling performed when the preset second retry condition is not met, when any wake-up signal from any access point is received, the station is woken up in order to attempt to associate the station with the access point.

In one example, the station STA 1 listens to wake-up frames from all access points in order to attempt to be associated with any surrounding access point. That is, the MR of the station STA 1 always remains in the sleep state, and the WUR listens to the wake-up frames from all the access points. When the WUR receives a wake-up frame sent by any access point (for example, when the WUR receives a wake-up frame sent by an access point AP 3 to another station in FIG. 3), the WUR wakes up the MR, and sends, using the MR based on the received wake-up frame, an association request frame whose target address points to the access point in order to attempt to associate station STA 1 with the access point.

219. When the station is in the sleep, determine whether sleep duration reaches the maximum allowable sleep duration.

220. Wake up the station when the sleep duration reaches the maximum allowable sleep duration.

For example, in the sleep that is of the station and that is started through controlling performed when the preset second retry condition is met, when the sleep duration reaches the maximum allowable sleep duration, step 220 is performed to wake up the station, then step 216 is performed again to start a sleep again, the processes in step 217 and step 218 continue to be performed to listen to the wake-up signal, and the foregoing process is repeated before any wake-up signal from any access point is received. In this way, the station may remain in the sleep state in a large amount of time in which the station attempts to be associated with any surrounding access point, thereby reducing energy consumption.

In still another implementation, when the station cannot be associated with any known access point, the station may scan access points surrounding the station to attempt to associate the station with a surrounding access point. In an example, the station STA 1 scans surrounding access points using the MR (for example, receives any signal from a surrounding access point within a preset period of time, or sends a signal through broadcasting such that all access points that can receive the signal return response signals, which may be not limited thereto), and then selects an access point from the access points obtained through scanning, to send the association request to the access point. Parameters based on which selection is performed may include but are not limited to a signal strength indicator (Received Signal Strength Indication), a resource occupation rate of an access point at a current moment, a service range supported by the access point, and the like (the access points obtained through scanning may also be sorted based on these parameters in order to attempt to sequentially associate the STA 1 with the access points in a sorting order). When no surrounding access point is obtained through scanning, the processes in step 216 to step 220 may be performed to listen, in a sleep, to the wake-up signals from all the access points, and when the sleep ends, the STA 1 scans the surrounding access points again to select one access point, to send the association request to the access point. In comparison with the previous implementation, scanning the surrounding access points may cause more energy consumption, but this better helps to associate the station with an access point as soon as possible, to transmit data, and better helps to associate the station with a proper access point based on selection of the access point. Certainly, the foregoing several manners are merely examples of attempting to associate the station with any surrounding access point, and a manner used during implementation may be not limited to the foregoing several manners.

With reference to step 216 to step 220, it can be learned that before the station is successfully associated with any access point, the station always performs the processes in step 216 to step 220 cyclically. This forms a third phase after the station receives the handover management signal. In the third phase, the station repeatedly attempts to be associated with any surrounding access point, and properly enters the sleep state to reduce power consumption. Referring to the scenario shown in FIG. 3, if the goods corresponding to the station STA 1 are not moved out of the service range of the access point AP 2 according to the predetermined plan, but enters an environment (in this environment, the station STA 1 cannot be associated with the target access point, and cannot be associated with the first access point) unknown to the station STA 1. The station STA 1 attempts to be associated with any surrounding access point to access the network, to avoid loss of the station.

For the procedure shown in FIG. 5A and FIG. 5B, it should be noted that same or similar processes or same sub-processes in the shown processes may have a same execution body and/or may be performed in a same or similar manner. For example, step 207, step 214, and step 219 are all used to wake up the station when the sleep duration reaches the maximum allowable sleep duration. Therefore, step 207, step 214, and step 219 may be implemented, for example, using a same timer according to same processing logic. For another example, the determining whether a first retry condition is met in step 204 and the determining whether a second retry condition is met in step 211 may be performed in a same process setting a value of a counter Retries_Count to 0 when receiving the handover management signal from the first access point, adding 1 to the value of the counter Retries_Count based on an original value each time an attempt to associate the station with the access point fails, and after the process jumps to a loop start point each time the attempt to associate the station with the access point fails, determining a to-be-performed operation based on the value of the counter Retries_Count, when the value of the counter Retries_Count is less than a first preset value Retries_MaxCount_1 (that is, when the first retry condition is met), attempting to associate the station with the target access point according to the processes in the first phase, when the value of the counter Retries_Count is greater than or equal to the first preset value Retries_MaxCount_1 (that is, when the second retry condition is met) and is less than a second preset value Retries_MaxCount_2, attempting to associate the station with the first access point according to the processes in the second phase, and when the value of the counter Retries_Count is greater than or equal to the second preset value Retries_MaxCount_2 (that is, when the second retry condition is not met), attempting to associate the station with any surrounding access point according to the processes in the third phase. It may be understood that the first preset value Retries_MaxCount_1 is less than the second preset value Retries_MaxCount_2.

It can be learned that before the operation procedure performed in response to the handover management signal ends, the operation of waking up the station is performed when the sleep duration of any sleep of the station reaches the maximum allowable sleep duration in the handover management signal. Therefore, it can be ensured that in any case, the station is not always in a disconnected state in which the station is out of all BSSs. That is, a disadvantage that the station is easily disconnected in a sleep mechanism of a related wireless communications system can be overcome. In another implementation, the data of the maximum allowable sleep duration may be independent of the handover management signal, for example, is added to any downlink control signal (for example, a configuration update signal) except the handover management signal such that the data is received at a moment before any access point is disassociated from the station. This may be not limited thereto.

It can be further learned that in the processes in step 206 and step 214, before the station falls into a sleep, some access points that need to be listened on are specified for the station, and the station is woken up when any wake-up signal (that is, a wake-up signal sent by the access point to any other station) sent by any one of these access points is received. Therefore, in addition to being woken up by an associated access point, the station may wake up when obtaining, through listening, a wake-up signal sent by another prespecified access point. It may be understood that an access point that needs to be listened on is determined before a sleep such that a case in which the station is disconnected is reduced or avoided, and reliability of the wireless communications system can be improved.

Corresponding to the foregoing wireless communication method applied to a station, an embodiment of this application provides a wireless communication method applied to an access point, including sending a downlink control signal to a station associated with the access point, where the downlink control signal includes data of maximum allowable sleep duration corresponding to the station such that the station ends a sleep when sleep duration reaches the maximum allowable sleep duration. An optional form of the downlink control signal and an optional transmission manner of the downlink control signal are described above in detail. A process of the wireless communication method applied to an access point in this embodiment corresponds to the foregoing wireless communication method applied to a station. An example of the wireless communication method is described above in detail, and details are not described herein again.

Figure 6:
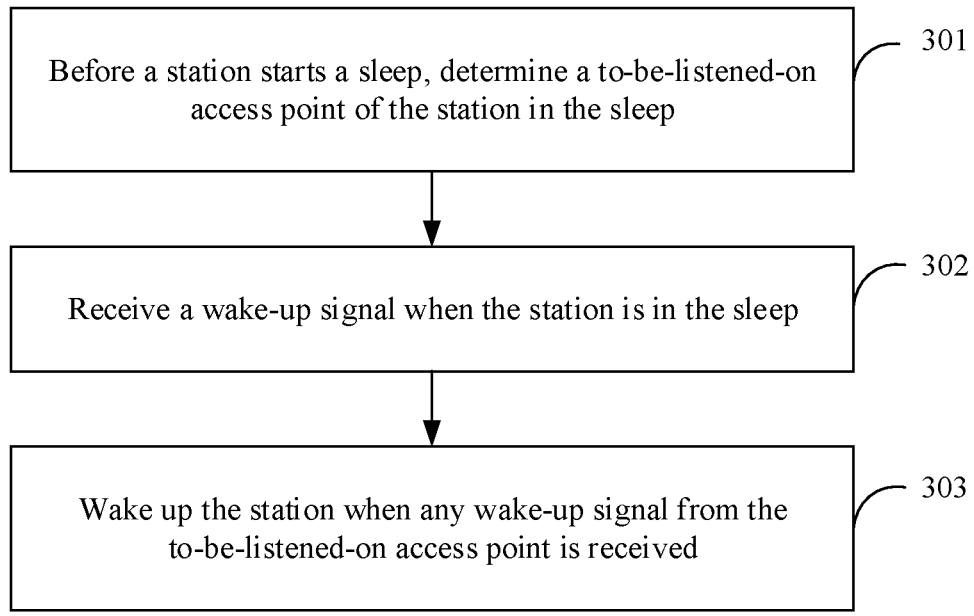
FIG. 6 is a flowchart of steps in a wireless communication method applied to a station according to another embodiment of this application.

FIG. 6 is a flowchart of steps in a wireless communication method applied to a station according to another embodiment of this application. Referring to FIG. 6, the wireless communication method applied to a station includes the following steps.

301. Before the station starts a sleep, determine a to-be-listened-on access point of the station in the sleep, where the to-be-listened-on access point is selected from an access point other than an access point associated with the station.

302. Receive a wake-up signal when the station is in the sleep.

303. Wake up the station when any wake-up signal from the to-be-listened-on access point is received.

It should be noted that there may be one or more to-be-listened-on access points, for a sleep or some sleeps of a station, any wake-up signal sent by the to-be-listened-on access point can wake up the station from a sleep, and the to-be-listened-on access point is an access point other than the access point associated with the station. In an example, a to-be-listened-on access point list is stored by a WUR of the station, and the station and/or the access point associated with the station may add, to the to-be-listened-on access point list at any moment, an access point whose related information is known such that the WUR receives (or listens to), in a sleep period of the station, a wake-up signal from a listed access point in the to-be-listened-on access point list based on the to-be-listened-on access point list, and wakes up the station when receiving any wake-up signal sent by any listed access point in the to-be-listened-on access point list. In this example, each time the station starts a sleep, all listed access points in the to-be-listened-on access point list are to-be-listened-on access points of the station in the sleep. Certainly, in addition to a manner in which the to-be-listened-on access point is determined according to the stored to-be-listened-on access point list, the to-be-listened-on access point may be further determined in any one of the following manners or a combination of at least two of the following manners a manner in which the to-be-listened-on access point is determined based on a downlink control signal received from an access point associated with the station before the station starts a sleep, a manner in which the to-be-listened-on access point is determined according to a related policy configured in the station and stored access point information (for example, in the foregoing step 206, when a specific condition is met, a target access point is determined as a to-be-listened-on access point based on stored related information of the target access point), and a manner in which the to-be-listened-on access point is determined according to default settings (for example, a specific access point is set to a default and/or fixed to-be-listened-on access point point). The manners may not be limited thereto.

It can be learned that before the station falls into the sleep, the to-be-listened-on access point is determined from an access point other than the access point associated with the station, and the station is woken up when the station receives, in the sleep, any wake-up signal sent by the to-be-listened-on access point such that the station not only can be woken up by the associated access point, but also can be woken up when the station obtains, through listening, a wake-up signal sent by another prespecified access point. Therefore, this can be used to reduce or avoid occurrence of a case in which the station is disconnected, and improve reliability of a wireless communications system.

In an example, the wireless communication method applied to a station further includes receiving a handover management signal from a first access point when the station is not in a sleep, where the first access point is an access point that is associated with the station at a current moment, the handover management signal includes an identifier of a target access point, and the handover management signal is used to instruct the station to change the associated access point to the target access point. A process of changing an association relationship based on the handover management signal can be used to change a case in which the station passively determines whether the station moves out of a service range to a case in which the station is actively associated with the target access point. Therefore, time, energy, and communication resources that are consumed when the station repeatedly communicates with the first access point can be saved, and an access point that is associated with the station after the change can be controlled.

In an example, the wireless communication method applied to a station further includes, when the station is located outside a communication range of the target access point, controlling the station to start a sleep, where a to-be-listened-on access point of the station in the sleep includes the target access point, and sending a first association request signal after the station is woken up when any wake-up signal from the target access point is received in order to attempt to associate the station with the target access point. Whether the station is located outside the communication range of the target access point may be determined, for example, based on whether a response to a first association request message is received. It can be learned that the station enters a sleep each time after the station determined that the station is located outside the communication range of the target access point. This better helps to reduce energy consumption in comparison with a case of consecutive re-attempts.

In an example, the controlling the station to start a sleep, where a to-be-listened-on access point of the station in the sleep includes the target access point includes controlling the station to start a sleep, where the to-be-listened-on access point of the station in the sleep includes the target access point, and the station ends the sleep when sleep duration reaches first preset duration. Maximum allowable sleep duration is limited, to help to prevent the station from being disconnected in the sleep.

In an example, the wireless communication method applied to a station further includes, when the handover management signal is received, performing, based on the handover management signal, an operation of disassociating the station from the first access point. In this way, a conflict between association relationships between different access points and a same station can be avoided.

In an example, the wireless communication method applied to a station further includes transmitting a second association request signal when the station cannot be associated with the target access point in order to attempt to associate the station with the first access point. Whether the station can be associated with the target access point may be determined, for example, based on whether the first retry condition is met. In this way, when the station cannot be associated with the target access point, the station may be restored to a state in which the station is associated with the first access point. This can reduce resource overheads in comparison with directly associating the station with a surrounding access point.

In an example, the wireless communication method applied to a station further includes, when the station is located outside a communication range of the first access point, controlling the station to start a sleep, where a to-be-listened-on access point of the station in the sleep includes the first access point, and sending the second association request signal after the station is woken up when any wake-up signal from the first access point is received in order to attempt to associate the station with the first access point. Whether the station is located outside the communication range of the target access point may be determined, for example, based on whether a response to a second association request message is received. It can be learned that the station enters a sleep each time after the station determines that the station is located outside the communication range of the first access point. This better helps to reduce energy consumption in comparison with a case of consecutive re-attempts.

In an example, the controlling the station to start a sleep, where a to-be-listened-on access point of the station in the sleep includes the first access point includes controlling the station to start a sleep, where the to-be-listened-on access point of the station in the sleep includes the first access point, and the station ends the sleep when sleep duration reaches third preset duration. The maximum allowable sleep duration is limited, to help to prevent the station from being disconnected in the sleep.

In an example, the wireless communication method applied to a station further includes, when the station cannot be associated with any access point, controlling the station to start a sleep, and waking up the station when any wake-up signal from any access point is received in the sleep of the station in order to attempt to associate the station with the access point based on the received wake-up signal. Whether the station can be associated with the first access point may be determined, for example, based on whether the second retry condition is met. In this way, when the station cannot be associated with the target access point or the first access point, the station may be associated with a surrounding access point such that the station can be prevented from being disconnected.

It may be understood that the process shown in FIG. 5A and FIG. 5B may be used as a specific example of this embodiment. Each sub-process in this embodiment is described in detail in the process shown in FIG. 5A and FIG. 5B and related descriptions thereof, and details are not described herein again.

Figure 7:
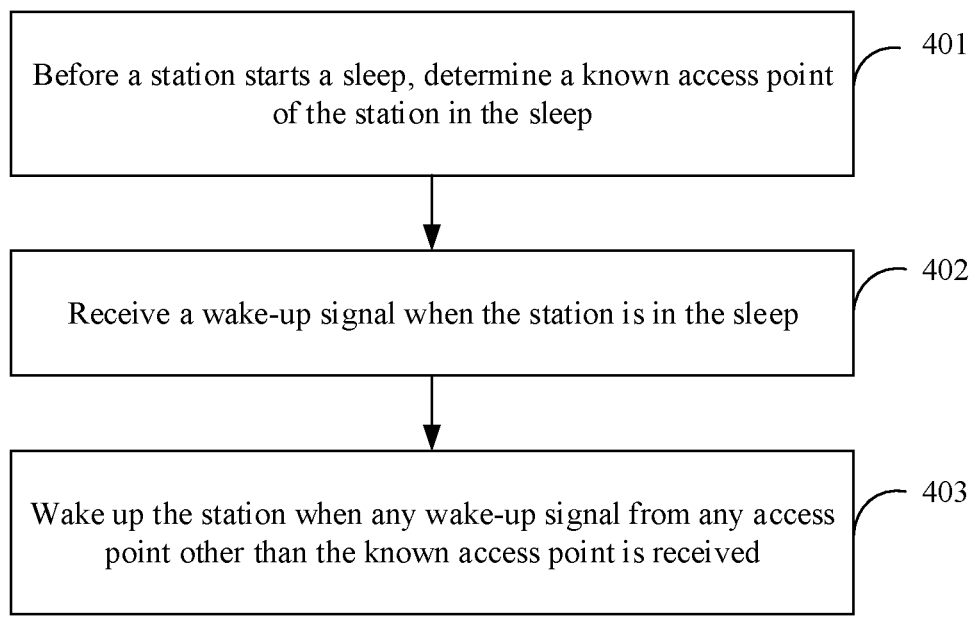
FIG. 7 is a flowchart of steps in a wireless communication method applied to a station according to another embodiment of this application.

FIG. 7 is a flowchart of steps in a wireless communication method applied to a station according to another embodiment of this application. Referring to FIG. 7, the wireless communication method applied to a station includes the following steps.

401. Before the station starts a sleep, determine a known access point of the station in the sleep, where the known access point includes an access point associated with the station.

402. Receive a wake-up signal when the station is in the sleep.

403. Wake up the station when any wake-up signal from any access point other than the known access point is received.

It should be noted that there may be one or more known access points (there may be zero access point, to be specific, any wake-up signal from all access points are listened to when the station is associated with no access point), and for a sleep or some sleeps of a station, any wake-up signal sent by the any access point other than the known access point can wake up the station from a sleep. In an example, an access point list is stored for a WUR of the station, and the station and/or the access point associated with the station may add, to the access point list at any moment, an access point whose related information is known such that the WUR receives (or listens to), in a sleep period of the station, a wake-up signal from an access point other than a listed access point in the access point list based on the access point list, and wakes up the station when receiving any wake-up signal sent by any access point other than the listed access point in the access point list. In this example, each time the station starts a sleep, all listed access points in the access point list are known access points of the station in the sleep. Certainly, in addition to a manner in which the access point is determined according to the stored known access point list, the known access point may be further determined in any one of the following manners or a combination of at least two of the following manners such as a manner in which the known access point is determined based on a downlink control signal received from an access point associated with the station before the station starts a sleep, a manner in which the known access point is determined according to a related policy configured in the station and stored access point information (for example, in the foregoing step 217, when a specific condition is met, the known access point is set to an empty set), and a manner in which the known access point is determined according to default settings (for example, a specific access point is set to a default and/or fixed access point, or several specific access points are set to default and/or fixed access points). The manners may not be limited thereto.

Figure 8:
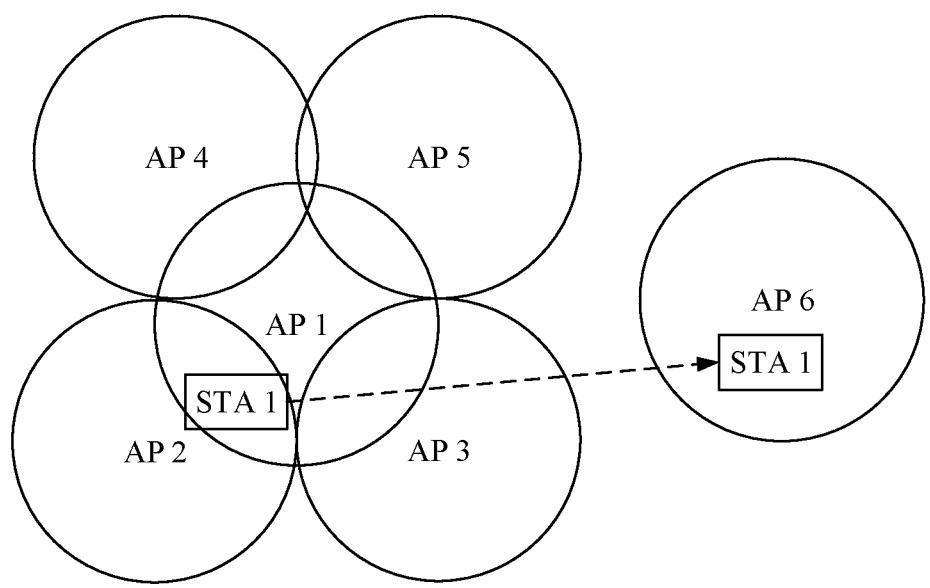
FIG. 8 is a schematic diagram of an application scenario according to an embodiment of this application.

FIG. 8 is a schematic diagram of a scenario of a sleep mechanism according to an embodiment of this application. FIG. 8 shows, using circles, service ranges of six access points from an access point AP 1 to an access point AP 6. A station STA 1 may move to any location. For example, the STA 1 moves from a location at which a service range of the access point AP 1 overlaps a service range of the access point AP 2 to a service range of the access point AP 6 (shown by a dashed line). For the station STA 1, a wireless communication method applied to the station may include a step of maintaining an access point list. For example, the access point list is maintained based on a received wake-up signal, and the known access point is a set including all access points in the access point list and an access point associated with the station. Based on maintenance of the access point list, when the station is out of a BSS of an associated access point when the station is in a sleep state, the station can find this case in a timely manner, to help to avoid a case in which the station is disconnected.

In an example, as shown in FIG. 8, the station STA 1 records all neighboring access points of the access point AP 1 in the access point list of the station STA 1 based on receiving and processing of a wake-up frame. A neighboring access point of an access point is an access point whose service range has an intersection with a service range of the access point. For example, in FIG. 8, the access point AP 2, the access point AP 3, the access point AP 4, and the access point AP 5 whose service ranges have intersections with the service range of the access point AP 1 each are a neighboring access point of the access point AP 1. The station STA 1 may perform an operation of deleting an access point from the access point list when maintaining the access point list. For example, the STA 1 deletes at least one access point from the access point list based on a notification from the associated access point, or deletes an access point that is in the access point list and that does not receive a wake-up signal for a time exceeding preset duration such that the access point list is maintained, as much as possible, as a set including the access point associated with the station and all the neighboring access points of the access point associated with the station. Certainly, a specific optional implementation of maintaining the access point list may not be limited thereto. In this case, when the station STA 1 is always in the service range of the access point AP 1, wake-up frames sent by the neighboring access points of the access point AP 1, namely, the access point AP 2, the access point AP 3, the access point AP 4, and the access point AP 5, do not affect a normal sleep of the station STA 1. However, when the station STA 1 moves, in the sleep state, out of the service range of the access point AP 1, a wake-up frame sent by an access point other than the access point AP 1 and the neighboring access points of the access point AP 1 can be received by the station STA 1, and consequently, affect the sleep of the station STA 1. For example, when the station STA 1 moves, in the sleep state, out of the service range of the access point AP 1 and enters the service range of the access point AP 6, for the station STA 1, the access point AP 6 is an access point other than the known access point. Therefore, when the station STA 1 receives a wake-up frame sent by the access point AP 6, the sleep ends. In this case, the station STA 1 may attempt to communicate with the access point AP 1, to learn that the station STA 1 is out of the service range of the access point AP 1. Therefore, a process of establishing an association with another access point may be triggered, to prevent the station STA 1 from being disconnected.

Figures 9, 10:
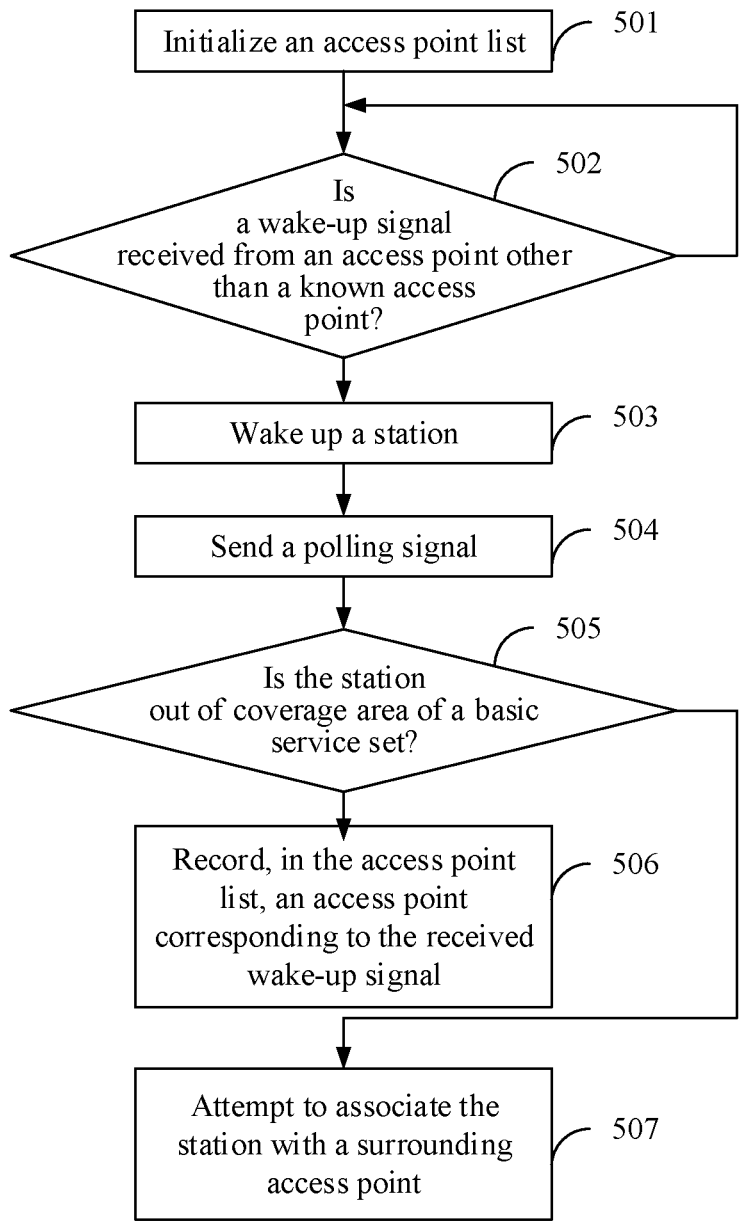
FIG. 9 is a flowchart of steps in a wireless communication method applied to a station according to another embodiment of this application.
FIG. 10 is a schematic diagram of a frame structure of a wake-up frame according to an embodiment of this application.

FIG. 9 is a flowchart of steps in a wireless communication method applied to a station according to another embodiment of this application. Referring to FIG. 9, in an implementation, a wireless communication method that is applied to a station and that includes maintenance of an access point list includes the following steps.

501. Initialize an access point list.

In an example, after the station is associated with an access point, the station receives a wake-up signal within first preset duration, and records, in the access point list, an access point corresponding to the received wake-up signal. Correspondingly, based on an original structure, a part may be added to a wake-up frame to set an access point identifier such that when receiving the wake-up frame, the WUR in the station can record different access points in the access point list based on the access point identifier. In still another example, when determining that the station is in a service range of an associated access point, the station scans access points surrounding the station, to record, in the access point list, an access point obtained through scanning. In a comparison example in which the access point list is not initiated, the station may repeatedly wake up from a sleep under the impact of a neighboring access point, and consequently, some resources such as time, energy, and channels are wasted. It can be seen that, the initializing an access point list is used as an optional step, and an initial set of neighboring access points can be provided, to reduce resources that are consumed for recording all neighboring access points in the access point list. It can be understood that, an implementation of initializing an access point list to resource overheads is not limited to the foregoing manner, and may be configured based on an application scenario during implementation. Optionally, the access point list may be initiated, for example, at a time when the station establishes a new association relationship, and the access point list may be cleared at the beginning. This may be not limited thereto.

502. When the station is in a sleep, receive a wake-up signal from an access point other than a known access point.

503. Wake up the station when any wake-up signal from an access point other than the known access point is received.

In an example, referring to FIG. 8, after a station STA 1 records access points AP 1 to AP 5 in the access point list by initializing the access point list, the station STA 1 listens to a wake-up frame based on the access point list in each sleep. For example, when receiving any wake-up frame, the WUR extracts the access point identifier from the wake-up frame, and compares the access point identifier with an access point in the access point list. When the access point identifier matches any access point in the access point list, the WUR discards related data of the wake-up frame and continues listening. When the access point identifier cannot match any access point in the access point list, the WUR wakes up the station STA 1.

504. Send a polling signal.

505. Determine whether the station is out of coverage area of a BSS in which a first access point is located.

For example, after the station is woken up when any wake-up signal from any access point other than the known access point is received, the polling signal is sent to determine whether the station is out of the coverage area of the BSS in which the first access point is located. The first access point is an access point associated with the station at a current moment.

In an example, referring to FIG. 8, after the station STA 1 is woken up when a wake-up frame from an access point other than the known access point is received, a polling frame (PS-Poll) is sent, using an MR, to the access point AP 1 associated with the station STA 1. Therefore, the STA 1 determines, based on a response status of the access point AP 1, whether the station STA 1 is out of the coverage area of the BSS in which the access point AP 1 is located. In an implementation, after a response of the access point AP 1 to the polling frame is received in second preset duration, the STA 1 determines that the station STA 1 is not out of the coverage area of the BSS in which the access point AP 1 is located. If the response of the access point AP 1 to the polling frame is not received when the second preset duration ends, the STA determines that the station STA 1 is out of the coverage area of the BSS in which the access point AP 1 is located.

506. When the station is out of the coverage area of the BSS in which the first access point is located, record, in the access point list, an access point corresponding to the received wake-up signal.

In an example, referring to FIG. 8, when the access point list records only the access point AP 1 and the access point AP 2, the WUR wakes up the station STA 1 when receiving a wake-up frame from the access point AP 3. Then, the station sends the polling frame to the access point AP 1 using the MR and receives a response frame sent by the access point AP 1, and therefore, the STA 1 determines that the station STA 1 is not out of the service range of the access point AP 1. Then the STA 1 adds the access point AP 3 to the access point list based on an access point identifier in the wake-up frame, and then the station STA 1 returns to a sleep state.

Optionally, when the station determines that the station is in the coverage area of the BSS in which the first access point is located, the station temporarily stops to be woken up within third preset duration when any wake-up signal from any access point other than the known access point is received. In an example, after the access point AP 3 is added to the access point list, the station STA 1 returns to the sleep state, and then the WUR is in a recording state within 30 seconds that are used as the third preset duration. In the recording state, when receiving a wake-up frame from any access point other than the known access point, the WUR directly records the access point in the access point list based on an access point identifier in the wake-up frame, and does not perform the operation of waking up the station STA 1.

In a comparison example, nine new access points are successively added and placed around the access point AP 1, and become neighboring access points of the access point AP 1. In this case, the nine access points are not recorded in the access point list corresponding to the station STA 1. Therefore, when a wake-up frame from any access point is received, the STA 1 wakes up, and determines whether the STA 1 can communicate with the access point AP 1. Consequently, the station STA 1 may frequently fall into a sleep and wake up in a very short period of time, causing wastes such as energy consumption and channel occupation. However, based on the foregoing example, after the station STA 1 wakes up under the action of the wake-up frame from an access point and returns to the sleep state, the STA 1 may directly record remaining eight access points in the access point list within the third preset duration, and the sleep state remains. It can be learned that the foregoing related setting of the third preset duration helps to avoid frequently waking up the station, to help to reduce overheads of related resources.

507. When the station is out of the coverage area of the BSS in which the first access point is located, attempt to associate the station with a surrounding access point.

In an example, referring to FIG. 8, when receiving a wake-up frame of the access point AP 6, the WUR wakes up the station STA 1, and then the STA 1 sends a polling frame to the access point AP 1 using the MR. Therefore, the STA 1 determines that the station STA 1 is out of the service range of the access point AP 1, and then the STA 1 starts to attempt to associate the station with the surrounding access point. In an implementation, when the station determines that the station is located outside the coverage area of the BSS in which the first access point is located, a to-be-associated access point is selected from the access point surrounding the station at a current moment, and an association request signal is sent in order to attempt to associate the station with the access point to be associated. When the station determines that the station cannot be associated with any access point, the station is controlled to start a sleep, and the station is woken up when any wake-up signal from any access point is received in the sleep of the station such that the station sends an association request based on the received wake-up signal in order to attempt to associate the station with the access point. A process of attempting to associate the station with the surrounding access point may be the same as that shown in the third phase in the embodiment corresponding to FIG. 5A and FIG. 5B. Details are not described herein again. In another implementation, the station may directly send the association request based on the received wake-up signal in order to attempt to be associated with an access point other than the known access point. It may be understood that a manner of attempting to associate the station with the surrounding access point may not be limited to the foregoing manner.

With reference to steps 501 to 507, when the station is out of a BSS of an associated access point when the station is in a sleep state, the station can find this case in a timely manner, and perform corresponding processing, to help to avoid a case in which the station is disconnected. In addition, the wireless communication method in this embodiment may further include waking up the station when sleep duration of any sleep of the station reaches maximum allowable sleep duration in a downlink control signal. In this way, this may help to prevent the station from being disconnected. For example, after the station is woken up, processes in step 504 to step 507 may be performed such that when no wake-up signals sent by some access points other than the known access point can be received by the station, the station is prevented from being disconnected.

FIG. 10 is a schematic diagram of a frame structure of a wake-up frame according to an embodiment of this application. Referring to FIG. 10, an 802.11 legacy preamble is at the beginning of the frame structure of the wake-up frame. To be specific, the 802.11 legacy preamble is a legacy preamble portion of a physical frame specified in the IEEE 802.11 protocol, for example, a legacy short training field (L-STF), a legacy long training field (L-LTF), and a legacy signal (L-SIG) field, and has functions including time synchronization, frequency synchronization, channel estimation, channel backoff time estimation performed by another station, and the like. To enable a WUR to receive the wake-up frame to perform time synchronization and frequency synchronization, a wake-up frame preamble (WUP Preamble) is further included after the legacy preamble. The access point identifier is set between the wake-up frame preamble and the wake-up frame load (WUP Payload). The wake-up frame load may carry a behavior indication of a WUR such that after waking up the MR, the MR may generate a subsequent action. For example, after the WUR wakes up the MR, the MR uploads data, or the MR is woken up to turn on some switches of the WUR. Then, the wake-up frame may further include another optional part, to be applied to different types of application scenarios.

Figure 11:
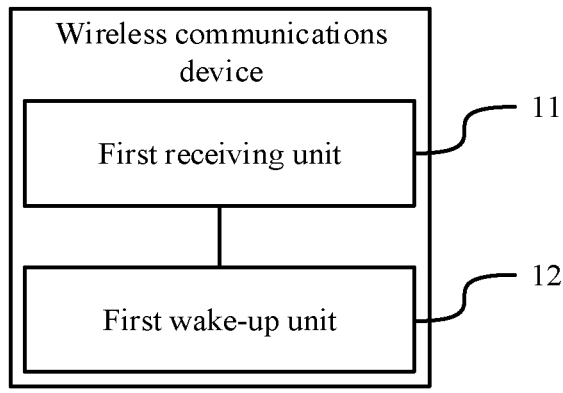
FIG. 11 is a structural block diagram of a wireless communications device applied to a station according to an embodiment of this application.

FIG. 11 is a structural block diagram of a wireless communications device applied to a station according to an embodiment of this application. Referring to FIG. 11, the wireless communications device includes a first receiving unit 11 and a first wake-up unit 12. The first receiving unit 11 is configured to receive a downlink control signal from an access point associated with the station. The downlink control signal includes data of maximum allowable sleep duration corresponding to the station. The first wake-up unit 12 is configured to wake up the station when sleep duration of the station reaches the maximum allowable sleep duration. It should be noted that the wireless communications device may be, for example, any apparatus or another component that can be used as the station. For other related details, refer to the foregoing method embodiments. In addition, the first receiving unit 11 may be further configured to implement at least one receiving step in the foregoing wireless communication method embodiment applied to an access point, and another step explicitly or implicitly including a receiving process in the foregoing method embodiments.

In a possible implementation, the first receiving unit 11 includes a first receiving module. The first receiving module is configured to receive a handover management signal from a first access point when the station is not in a sleep. The first access point is an access point that is associated with the station at a current moment. The handover management signal includes an identifier of a target access point and the data of the maximum allowable sleep duration corresponding to the station, and the handover management signal is used to instruct the station to change the associated access point to the target access point.

In a possible implementation, the wireless communications device further includes a first sending unit and a first control unit that are not shown in FIG. 11. The first sending unit is configured to, after the handover management signal is received, send a first association request signal based on the identifier of the target access point in the handover management signal in order to attempt to associate the station with the target access point. The first control unit is configured to, when the attempt to associate the station with the target access point fails and a preset first retry condition is met, control the station to start a sleep in order to attempt again to associate the station with the target access point again after the station ends the sleep.

In a possible implementation, the wireless communications device further includes a second sending unit and a second wake-up unit that are not shown in FIG. 11. The second sending unit is configured to receive the wake-up signal when the station is in the sleep. The second wake-up unit is configured to, in the sleep that is of the station and that is started through controlling performed when the preset first retry condition is met, when any wake-up signal from the target access point is received, wake up the station.

In a possible implementation, the wireless communications device further includes a second sending unit and a second control unit that are not shown in FIG. 11. The second sending unit is configured to send a second association request signal when the preset first retry condition is not met in order to attempt to associate the station with the first access point. The second control unit is configured to, when the attempt to associate the station with the first access point fails and a preset second retry condition is met, control the station to start a sleep in order to attempt again to associate the station with the first access point after the station ends the sleep.

In a possible implementation, the wireless communications device further includes the second receiving unit and a third wake-up unit that are not shown in FIG. 11. The second receiving unit is configured to receive the wake-up signal when the station is in the sleep. The third wake-up unit is configured to, in the sleep that is of the station and that is started through controlling performed when the preset second retry condition is met, when any wake-up signal from the first access point is received, wake up the station.

In a possible implementation, the wireless communications device further includes a third control unit, the second receiving unit, and a fourth wake-up unit that are not shown in FIG. 11. The third control unit is configured to, when the preset second retry condition is not met, control the station to start a sleep. The second receiving unit is configured to receive the wake-up signal when the station is in the sleep. The fourth wake-up unit is configured to, in the sleep that is of the station and that is started through controlling performed when the preset second retry condition is not met, when any wake-up signal from any access point is received, wake up the station in order to attempt to associate the station with the access point.

In a possible implementation, the wireless communications device further includes a third sending unit that is not shown in FIG. 11. The third sending unit is configured to send an acknowledgment signal to the first access point after the handover management signal is received such that a disassociation process is completed between the station and the first access point.

In a possible implementation, the first wake-up unit is further configured to, before an operation procedure performed in response to the handover management signal ends, wake up the station when sleep duration of any sleep of the station reaches the maximum allowable sleep duration in the handover management signal.

In a possible implementation, the first receiving unit includes a second receiving module. The second receiving module is configured to receive a configuration update signal from the access point associated with the station, to update, based on data of maximum allowable sleep duration in the configuration update signal, the maximum allowable sleep duration stored by the station.

Figure 12:
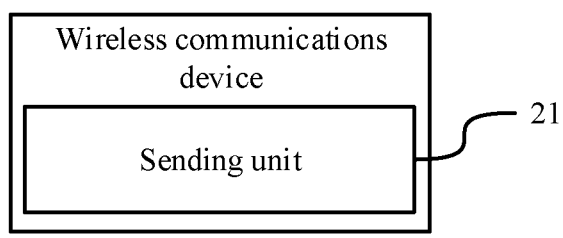
FIG. 12 is a structural block diagram of a wireless communications device applied to a station according to another embodiment of this application.

FIG. 12 is a structural block diagram of a wireless communications device applied to an access point according to an embodiment of this application. Referring to FIG. 12, the wireless communications device includes a sending unit 21 configured to implement at least one sending step in the foregoing wireless communication method embodiment applied to an access point, and another step explicitly or implicitly including a sending process in the foregoing method embodiments. For example, the sending unit is configured to send a downlink control signal to a station associated with the access point. The downlink control signal includes data of maximum allowable sleep duration corresponding to the station such that the station ends a sleep when sleep duration reaches the maximum allowable sleep duration. It should be noted that the wireless communications device may be, for example, any apparatus or another component that can be used as the access point. For other related details, refer to the foregoing method embodiments.

In a possible implementation, the sending unit 21 includes a first sending module configured to send a handover management signal to the station. The handover management signal includes an identifier of a target access point and the data of the maximum allowable sleep duration corresponding to the station, and the handover management signal is used to instruct the station to change the associated access point to the target access point.

In a possible implementation, the wireless communications device further includes a receiving unit that is not shown in FIG. 12. The receiving unit is configured to receive an acknowledgment signal from the station after the handover management signal is sent to the station such that a disassociation process is completed between the access point and the station.

In a possible implementation, the sending unit 21 includes a second sending module configured to send a configuration update signal to the station associated with the access point such that the station updates, based on data of maximum allowable sleep duration in the configuration update signal, the maximum allowable sleep duration stored by the station.

Figure 13:
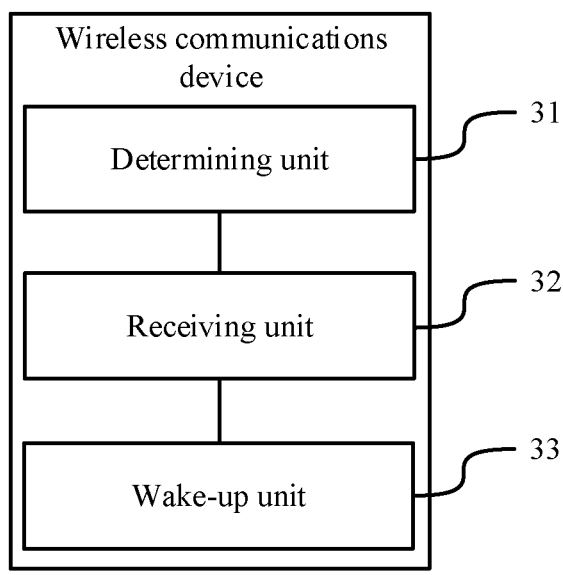
FIG. 13 is a structural block diagram of a wireless communications device applied to a station according to another embodiment of this application.

FIG. 13 is a structural block diagram of a wireless communications device applied to a station according to an embodiment of this application. The wireless communications device includes a determining unit 31, a receiving unit 32, and a wake-up unit 33. The determining unit 31 is configured to determine a known access point of the station in a sleep before the station starts the sleep. The known access point includes an access point associated with the station. The receiving unit 32 is configured to receive a wake-up signal when the station is in the sleep. The wake-up unit 33 is configured to wake up the station when any wake-up signal from any access point other than the known access point is received. It should be noted that the wireless communications device may be, for example, any apparatus or another component that can be used as the station. For other related details, refer to the foregoing method embodiments. In addition, the receiving unit 32 may be further configured to implement at least one receiving step in the foregoing wireless communication method embodiments applied to a station, and another step explicitly or implicitly including a receiving process in the foregoing method embodiments.

In a possible implementation, the wireless communications device further includes a maintenance unit that is not shown in FIG. 13. The maintenance unit is configured to maintain an access point list based on the received wake-up signal, the access point list is used to record the access point associated with the station and a neighboring access point of the access point, the neighboring access point is an access point whose service range has an intersection with a service range of the access point, and the known access point is a set including all access points in the access point list.

In a possible implementation, the wireless communications device further includes a sending unit that is not shown in FIG. 13. The sending unit is configured to send a polling signal after the station is woken up when any wake-up signal from any access point other than the known access point is received, to determine whether the station is out of a coverage area of a BSS in which a first access point is located. The first access point is an access point associated with the station at a current moment.

In a possible implementation, the wake-up unit 33 is further configured to, when the station is in the coverage area of the BSS in which the first access point is located, temporarily stop waking up the main communication circuit within third preset duration when any wake-up signal from any access point other than the known access point is received.

In a possible implementation, the wireless communications device further includes a selection unit and an association unit that are not shown in FIG. 13. The selection unit is configured to, when the station is located outside a communication range of the first access point, select a to-be-associated access point from an access point surrounding the station at the current moment. The association unit is configured to send a third association request signal in order to attempt to associate the station with the to-be-associated access point.

In a possible implementation, the wireless communications device further includes a first control unit that is not shown in FIG. 13. The first control unit is configured to control the station to end a sleep when sleep duration reaches a preset threshold, and after the station ends the sleep, determine whether the station is located outside the coverage area of the BSS in which the first access point is located. The first access point is an access point associated with the station at the current moment.

In a possible implementation, the wireless communications device further includes a second control unit that is not shown in FIG. 13. The second control unit is configured to, when the station cannot be associated with any access point, control the station to start a sleep, and wake up the station when any wake-up signal from any access point is received in the sleep of the station in order to attempt to associate the station with the access point based on the received wake-up signal.

Figure 14:
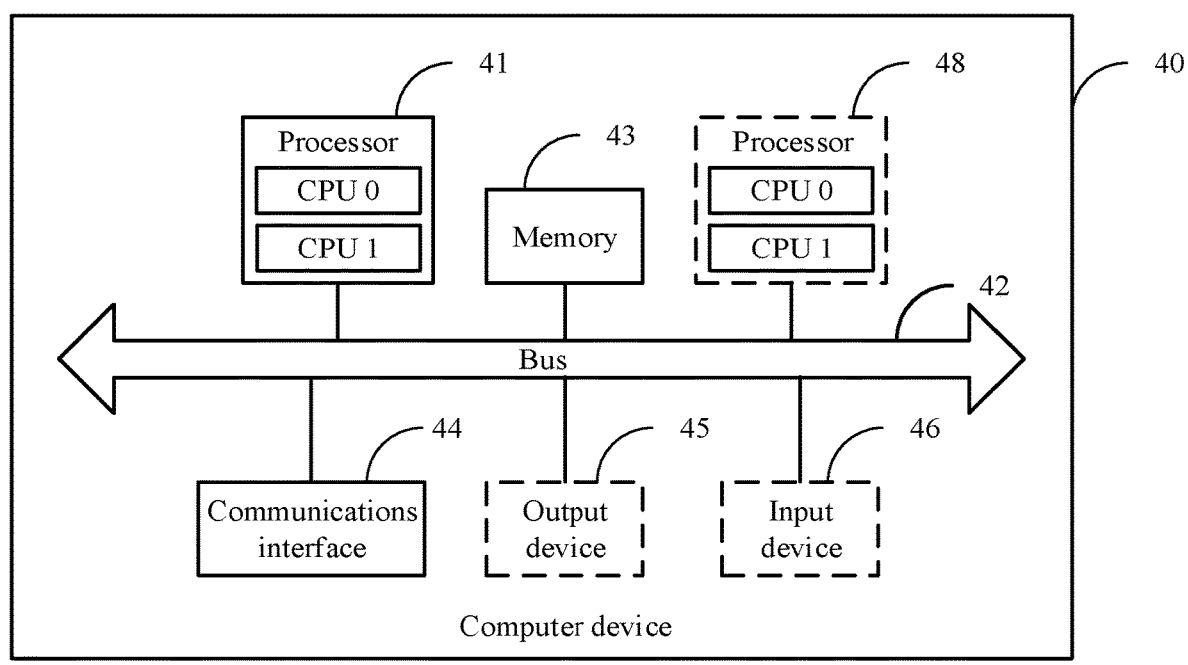
FIG. 14 is a schematic structural diagram of a computer device according to an embodiment of this application.

FIG. 14 is a schematic structural diagram of a computer device according to an embodiment of this application. The computer device may be configured to constitute any station, any access point, and any wireless communications device in the embodiments of this application. Referring to FIG. 14, the computer device 40 includes at least one processor 41, a bus 42, a memory 43, and at least one communications interface 44. Certainly, the computer device 40 may further include general components such as an antenna, a baseband processing component, and an intermediate RF processing component. This is not limited in this embodiment of this application.

The processor 41 may include a general central processing unit (CPU), a microprocessor, an application-specific integrated circuit (ASIC), a digital signal processor (DSP), a digital signal processing device (DSPD), a programmable logic device (PLD), a field programmable gate array (FPGA), a controller, a microcontroller, or a plurality of integrated circuits configured to control program execution.

The bus 42 is mainly configured to transfer information between other components of the computer device 40. The communications interface 44 is mainly configured to communicate with another storage device or network device. When the communications structure 44 is a network interface, a network accessed by the communications interface 44 may be, for example, the Ethernet, a RAN, or a WLAN.

The memory 43 may include a read-only memory (ROM), another type of static storage device that can store static information and an instruction, a random access memory (RAM), or another type of dynamic storage device that can store information and an instruction, or may include an electrically erasable programmable read-only memory (EEPROM), a compact disc read-only memory (CD-ROM) or another compact disc storage, an optical disc storage (including a compact disc, a laser disc, an optical disc, a digital versatile disc, a BLU-RAY disc, and the like), a magnetic disk storage medium or another magnetic storage device, or any other medium that can be configured to carry or store expected program code in a form of an instruction or a data structure and that can be accessed by a computer. However, this is not limited thereto. The memory may be disposed independently, or may be integrated into the processor.

The memory 43 is configured to store executable code, and the processor 41 controls the execution of the executable code. The processor 41 is configured to execute the executable code stored in the memory 43.

In specific implementation, in an embodiment, the processor 41 may include one or more CPUs, such as a CPU 0 and a CPU 1 in FIG. 14.

In specific implementation, in an embodiment, the computer device 40 may include a plurality of processors, for example, the processor 41 and a processor 48 in FIG. 14. Each of these processors may be a single-core processor (single-CPU), or may be a multi-core processor (multi-CPU). The processor herein may be one or more devices, circuits, and/or processing cores configured to process data (for example, a computer program instruction).

In specific implementation, in an embodiment, the computer device 40 may further include an output device 45 and an input device 46. The output device 45 communicates with the processor 41, and may display information in a plurality of manners. For example, the output device 45 may be a liquid crystal display (LCD), a light emitting diode (LED) display device, a cathode ray tube (CRT) display device, or a projector. The input device 46 may communicate with the processor 41 using the bus 42, and may accept input of a user in a plurality of manners. For example, the input device 46 may be a mouse, a keyboard, a touchscreen device, or a sensing device.

The computer device 40 may be a general-purpose computer device or a dedicated computer device. In specific implementation, the computer device 40 may be a desktop computer, a portable computer, a network server, a palmtop computer (PDA), a mobile phone, a tablet computer, a wireless terminal device, a communications device, an embedded device, or a device with a similar structure. A type of the computer device 40 is not limited in this embodiment of this application.

It should be noted that the computer device shown in FIG. 14 gives only a possible hardware implementation of each component. Based on a difference or a change of a function of each component of the system, a hardware component of the computer device may be added or deleted such that the computer device matches the function of each component of the system.

In the embodiments corresponding to FIG. 11, FIG. 12, and FIG. 13, the wireless communications device is presented in a form of a function unit/function module. The "unit/module" herein may be an ASIC, a processor and a memory that execute one or more software programs or firmware programs, an integrated logic circuit, and/or another component that can provide the foregoing function. In a simple embodiment, a device for implementing a wireless communications device may have a form shown in FIG. 14. For example, the at least some functions of at least one of the foregoing units and modules may be implemented by executing program code stored in the memory by the processor.

An embodiment of this application further provides a computer storage medium configured to store a computer software instruction used for any one of the foregoing wireless communication methods. The computer storage medium includes a program designed for executing the foregoing method embodiments. The wireless communication method provided in this application may be implemented by executing the stored program.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (a device), or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a magnetic disk memory, a CD-ROM, an optical memory, and the like) that include computer usable program code. The computer program is stored/distributed in a proper medium and is provided as or used as a part of the hardware together with another hardware, or may use another distribution form, for example, the Internet or another wired or wireless telecommunications system.

This application is described with reference to the flowcharts and/or block diagrams of the method, the apparatus (device), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine such that the instructions executed by the computer or the processor of the other programmable data processing device generate an apparatus for implementing a specific function in one or more procedures in the flowcharts and/or in one or more blocks in the block diagrams.

These computer program instructions may also be stored in a computer readable memory that can instruct the computer or the other programmable data processing device to work in a specific manner such that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto the computer or the other programmable data processing device such that a series of operations and steps are performed on the computer or the other programmable device to generate computer-implemented processing. Therefore, the instructions executed on the computer or the other programmable device provide steps for implementing a specific function in one or more procedures in the flowcharts and/or in one or more blocks in the block diagrams.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A wireless communication method, implemented by a station, wherein the wireless communication method comprises:
   receiving a downlink control signal from an access point associated with the station, wherein the downlink control signal comprises data of a maximum allowable sleep duration that corresponds to the station;
   sleeping in response to the station failing to associate with a target access point and a preset first retry condition is met, wherein the preset first retry condition includes a first time between a current moment and a moment at which a handover management signal is received, and the first time is greater than a preset time value; and
   waking up the station when a sleep duration of the station reaches the maximum allowable sleep duration.

2. The wireless communication method of claim 1, wherein receiving the downlink control signal from the access point associated with the station comprises
   receiving the handover management signal from a first access point when the station is awake, wherein the first access point is associated with the station at a previous moment, wherein the handover management signal comprises an identifier of the target access point and the data of the maximum allowable sleep duration corresponding to the station, and wherein the handover management signal instructs the station to change the access point to the target access point.

3. The wireless communication method of claim 2, further comprising:
   sending, after receiving the handover management signal, a first association request signal based on the identifier of the target access point in the handover management signal;
   attempting associating, after sending the first association request signal, the station with the target access point; and
   reattempt associating the station with the target access point after the station wakes up.

4. The wireless communication method of claim 3, further comprising:
   receiving a wake-up signal from the target access point when the station is asleep; and
   waking up the station in response to receiving the wake-up signal.

5. The wireless communication method of claim 3, further comprising:
   sending a second association request signal to associate the station with the first access point when the preset first retry condition is not met;
   sleeping in response to the station failing to associate with the first access point and a preset second retry condition is met; and
   reattempt associating the station with the first access point after the station wakes up.

6. The wireless communication method of claim 5, further comprising:
   receiving a wake-up signal from the first access point when the station is sleeping; and
   waking up the station in response to receiving the wake-up signal when the station fails to associate with the first access point and the preset second retry condition is met.

7. The wireless communication method of claim 5, further comprising:
controlling the station to start sleeping when the preset second retry condition is not met;
receiving a wake-up signal from one of the access point, the target access point, or the first access point when the station is asleep; and
waking up the station and attempt associating the station with the access point in response to receiving the wake-up signal is received.

8. The wireless communication method of claim 2, further comprising:
sending an acknowledgment signal to the first access point after the handover management signal is received;
completing, after sending the acknowledgement signal to the first access point after the handover management signal is received, a disassociation process between the station and the first access point.

9. The wireless communication method of claim 2, wherein waking up the station when sleep duration of the station reaches the maximum allowable sleep duration comprises waking up the station when the sleep duration of the station reaches the maximum allowable sleep duration in the handover management signal.

10. The wireless communication method of claim 1, wherein receiving the downlink control signal from the access point associated with the station comprises receiving a configuration update signal from the access point associated with the station to update, based on data of maximum allowable sleep duration in the configuration update signal, the maximum allowable sleep duration stored by the station.

11. A wireless communication method, implemented by an access point, wherein the wireless communication method comprises:
obtaining a downlink control signal comprising data of a maximum allowable sleep duration that corresponds to a station associated with the access point, wherein the downlink control signal instructs the station to wake up when a sleep duration reaches the maximum allowable sleep duration; and
sending the downlink control signal to the station, wherein the station is controlled to fall asleep in response to the station failing to associate with a target access point and a preset retry condition is met, wherein the preset retry condition includes a first time between a current moment and a moment at which a handover management signal is sent to the station, and the first time is greater than a preset time value.

12. The wireless communication method of claim 11, wherein sending the downlink control signal to the station associated with the access point comprises sending the handover management signal to the station, wherein the handover management signal comprises an identifier of the target access point and the data of the maximum allowable sleep duration that corresponds to the station, and wherein the handover management signal instructs the station to change the access point to the target access point.

13. The wireless communication method of claim 12, further comprising receiving an acknowledgment signal from the station in response to sending the handover management signal to the station, wherein a disassociation process is completed between the access point and the station based on receiving the acknowledgement signal from the station.

14. The wireless communication method of claim 11, wherein sending the downlink control signal to the station associated with the access point comprises sending a configuration update signal to the station associated with the access point, wherein the configuration update signal instructs the station to update, based on the data of the maximum allowable sleep duration in the configuration update signal, the maximum allowable sleep duration stored at the station.

15. A wireless communications device, implemented by a station, wherein the wireless communications device comprises:
a first receiver configured to receive a downlink control signal from an access point associated with the station, wherein the downlink control signal comprises data of a maximum allowable sleep duration that corresponds to the station;
a first wake-up circuit coupled to the first receiver, wherein the first wake-up circuit is configured to wake up the station when a sleep duration of the station reaches the maximum allowable sleep duration; and
a first controller configured to sleep in response to the station failing to associate with a target access point and a preset first retry condition is met, wherein the preset first retry condition includes a first time between a current moment and a moment at which a handover management signal is received, and the first time is greater than a preset time value.

16. The wireless communications device of claim 15, wherein the first receiver is configured to receive the handover management signal from a first access point when the station is awake, wherein the first access point is associated with the station at a previous moment, wherein the handover management signal comprises an identifier of the target access point and the data of the maximum allowable sleep duration corresponding to the station, and wherein the handover management signal instructs the station to change the first access point to the target access point.

17. The wireless communications device of claim 16, wherein the wireless communications device further comprises:
a first transmitter configured to:
send, after the handover management signal is received, a first association request signal based on the identifier of the target access point in the handover management signal; and
attempt to, after sending the handover management signal, associate the station with the target access point; and
the first controller is coupled to the first transmitter, and configured to reattempt to associate the station with the target access point after the station wakes up.

18. The wireless communications device of claim 17 further comprising:
a second receiver configured to receive a wake-up signal from the target access point when the station is asleep; and
a second wake-up circuit coupled to the second receiver and configured to wake up the station in response to receiving the wake-up signal.

19. The wireless communications device of claim 17, wherein the wireless communications device further comprises:
a second transmitter configured to send a second association request signal and attempt to associate the station with the first access point when the preset first retry condition is not met; and a second controller coupled to the second transmitter and configured to sleep in response to the station failing to associate with the first access point and a preset second retry condition is met; and configured to reattempt to associate the station with the first access point after the station wakes up.

20. The wireless communications device of claim 18, wherein the second receiver is further configured to receive a wake-up signal from the first access point when the station is sleeping, and wherein the wireless communications device further comprises a third wake-up circuit configured to wake up the station in response to receiving the wake-up signal is received when the station fails to associate with the first access point and <preset second retry condition is met.

21. The wireless communications device of claim 18, wherein the second receiver is configured to receive a wake-up signal from one of the access point, the target access point, or the first access point when the station is asleep, and wherein the wireless communications device further comprises:

a third controller configured to control the station to sleep when a preset second retry condition is not met; and a fourth wake-up circuit, coupled to the third controller, and configured to wake up the station and attempt to associate the station with one of the access point, the target access point, or the first access point when the wake-up signal is received.

22. The wireless communications device of claim 16, further comprising a third transmitter configured to:

send an acknowledgment signal to the first access point after the handover management signal is received; and complete, after sending the acknowledgment signal to the first access point, a disassociation process between the station and the first access point.

23. The wireless communications device of claim 16, wherein the first wake-up circuit is further configured to wake up, the station when sleep duration of the station reaches the maximum allowable sleep duration in the handover management signal.

24. The wireless communications device of claim 15, wherein the wireless communications device further comprises:

a second receiver configured to receive a configuration update signal from the access point; and update, based on data of maximum allowable sleep duration in the configuration update signal, the maximum allowable sleep duration stored by the station.

25. A wireless communications device, implemented by an access point, wherein the wireless communications device comprises a transmitter configured to:

obtain a downlink control signal, wherein the downlink control signal comprises data of a maximum allowable sleep duration that corresponds to a station associated with the access point, wherein the downlink control signal instructs the station to wake up when sleep duration reaches the maximum allowable sleep duration; and sending the downlink control signal to the station, wherein the station is controlled to fall asleep in response to the station failing to associate with a target access point and a preset retry condition is met, wherein the preset retry condition includes a first time between a current moment and a moment at which a handover management signal is sent to the station, and the first time is greater than a preset time value.

26. The wireless communications device of claim 25, wherein the transmitter is configured to send the handover management signal to the station, wherein the handover management signal comprises an identifier of the target access point and the data of the maximum allowable sleep duration corresponding to the station, and wherein the handover management signal instructs the station to change the access point to the target access point.

27. The wireless communications device of claim 26, wherein the wireless communications device further comprises a receiver coupled to the transmitter and configured to receive an acknowledgment signal from the station after in response to sending the handover management signal to the station; wherein a disassociation process is completed between the access point and the station in response to receiving the acknowledgment signal from the station.

28. The wireless communications device of claim 25, wherein the transmitter is further configured to send a configuration update signal to the station associated with the access point, wherein the configuration update signal instructs the station to update, based on data of maximum allowable sleep duration in the configuration update signal, the maximum allowable sleep duration stored by the station.

* * * * *